United States Patent
Ito et al.

(10) Patent No.: US 10,393,044 B2
(45) Date of Patent: Aug. 27, 2019

(54) CONTROL DEVICE FOR ENGINE AND CONTROL METHOD FOR ENGINE

(71) Applicant: Toyota Jidosha Kabushiki Kaisha, Toyota-shi, Aichi-ken (JP)

(72) Inventors: Hirokazu Ito, Shizuoka-ken (JP); Yuji Yamaguchi, Susono (JP); Yuji Miyoshi, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 145 days.

(21) Appl. No.: 15/642,897

(22) Filed: Jul. 6, 2017

(65) Prior Publication Data
US 2018/0017001 A1    Jan. 18, 2018

(30) Foreign Application Priority Data

Jul. 14, 2016 (JP) ................. 2016-139661

(51) Int. Cl.
*F02D 41/02* (2006.01)
*F01N 3/10* (2006.01)
(Continued)

(52) U.S. Cl.
CPC ......... *F02D 41/0235* (2013.01); *F01N 3/101* (2013.01); *F01N 11/002* (2013.01); *F02D 37/02* (2013.01); *F02D 41/0005* (2013.01); *F02D 41/0055* (2013.01); *F02D 41/0065* (2013.01); *F02D 41/123* (2013.01); *F01N 2240/36* (2013.01); *F01N 2430/06* (2013.01); *F01N 2560/06* (2013.01); *F01N 2900/0416* (2013.01);
(Continued)

(58) Field of Classification Search
CPC .. F02D 37/02; F02D 41/0005; F02D 41/0055; F02D 41/0065; F02D 41/0235; F02D 41/123; F02D 2041/0017; F02D 2200/0802; F01N 3/101; F01N 11/002; F01N 2240/36; F01N 2430/06; F01N 2560/06; F01N 2900/0416; Y02T 10/22; Y02T 10/42; Y02T 10/47
See application file for complete search history.

(56) References Cited

U.S. PATENT DOCUMENTS

2016/0169186 A1* 6/2016 Stroh ................. F02P 5/1516
                                                    123/406.48
2017/0058801 A1* 3/2017 Vigild ................. F02D 41/12

FOREIGN PATENT DOCUMENTS

JP         2007-016611 A    1/2007

* cited by examiner

*Primary Examiner* — Audrey K Bradley
(74) *Attorney, Agent, or Firm* — Dinsmore & Shohl LLP

(57) ABSTRACT

A control device includes an electronic control unit. During deceleration of the engine, when a temperature of a three-way catalyst is equal to or higher than a predetermined temperature and execution conditions of fuel cut processing are established, the electronic control unit executes first control for closing an exhaust shutoff valve, while fuel injection and ignition are continued. When the exhaust shutoff valve reaches the closed state in the first control, the electronic control unit executes second control for bringing the engine into an intake control state in which the intake throttle is closed and an EGR valve is in a predetermined open state. In the second control, the electronic control unit executes the fuel cut processing by stopping the ignition before the engine is brought into the intake control state and stopping the fuel injection after the engine is brought into the intake control state.

5 Claims, 13 Drawing Sheets

(51) Int. Cl.
*F01N 11/00* (2006.01)
*F02D 41/00* (2006.01)
*F02D 41/12* (2006.01)
*F02D 37/02* (2006.01)

(52) U.S. Cl.
CPC ................ *F02D 2041/0017* (2013.01); *F02D 2200/0802* (2013.01); *Y02T 10/22* (2013.01); *Y02T 10/42* (2013.01); *Y02T 10/47* (2013.01)

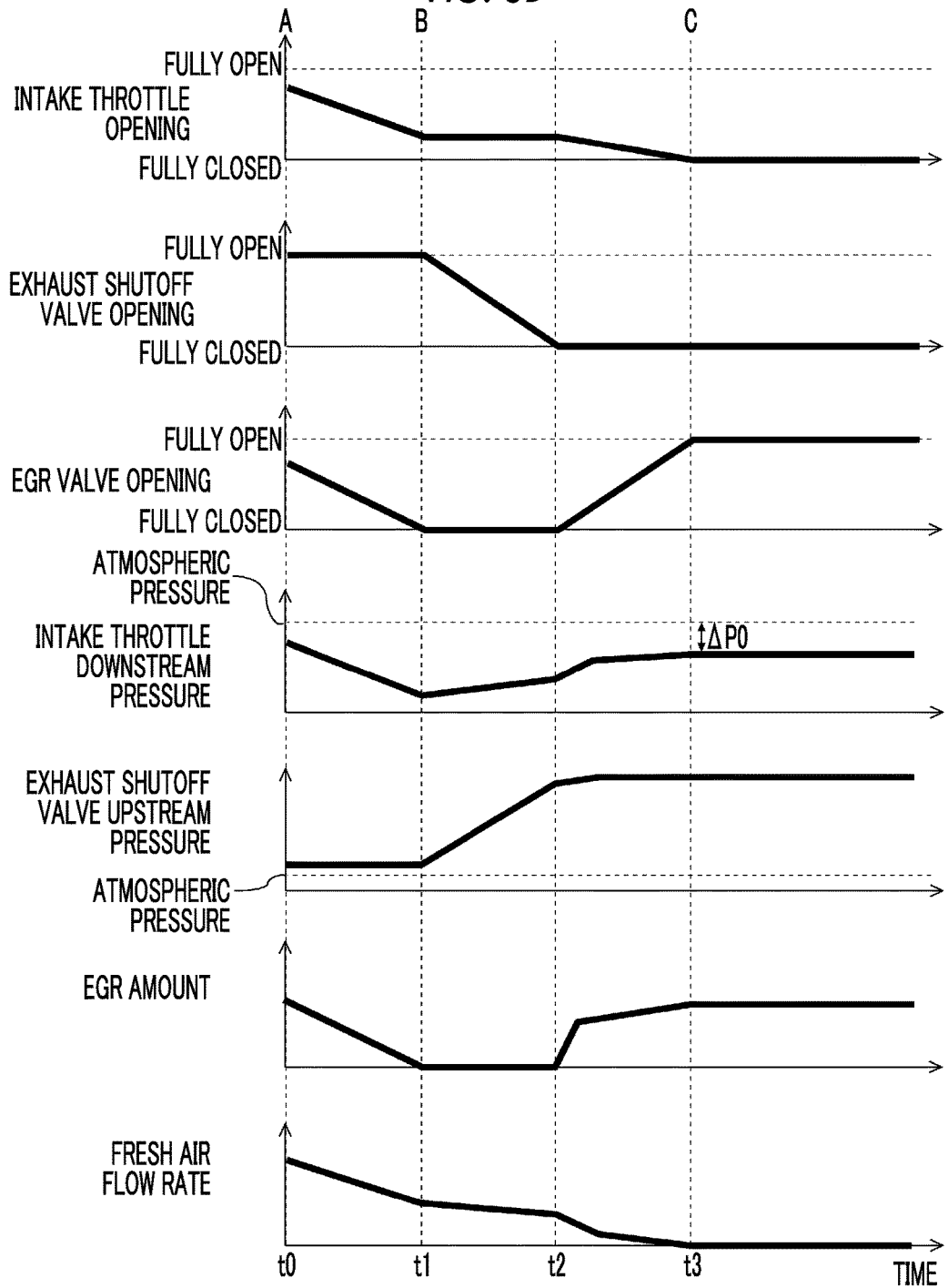

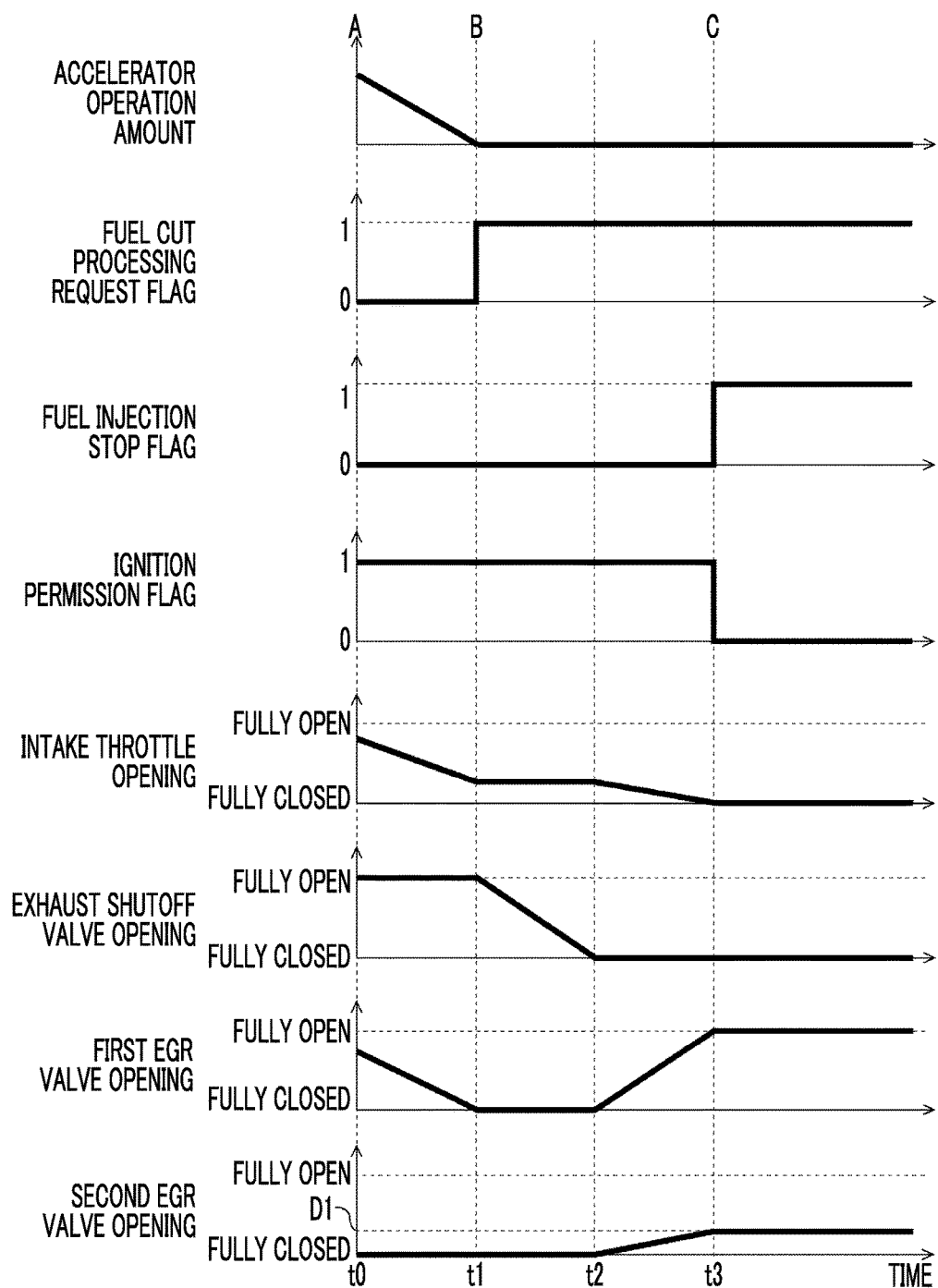

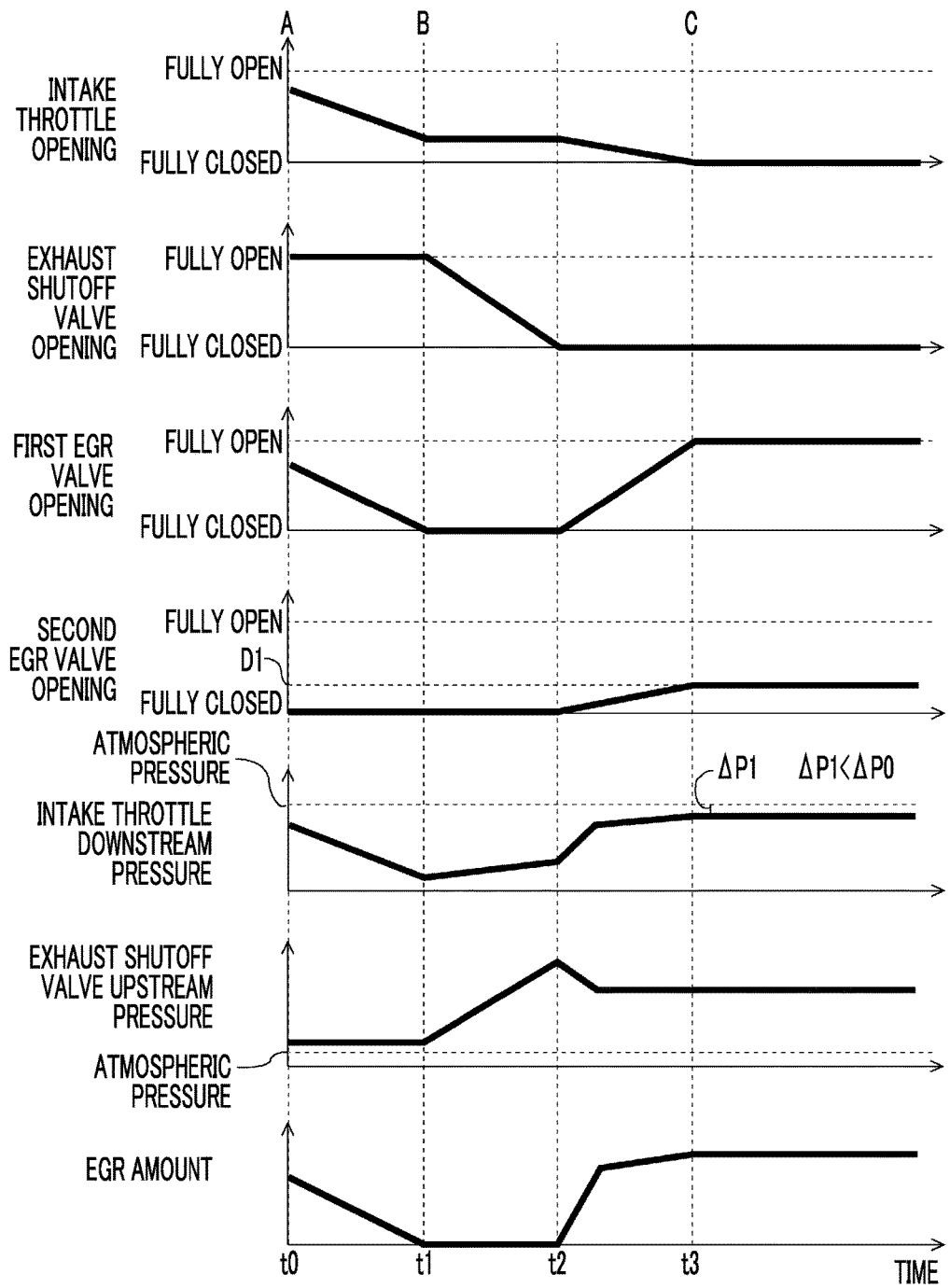

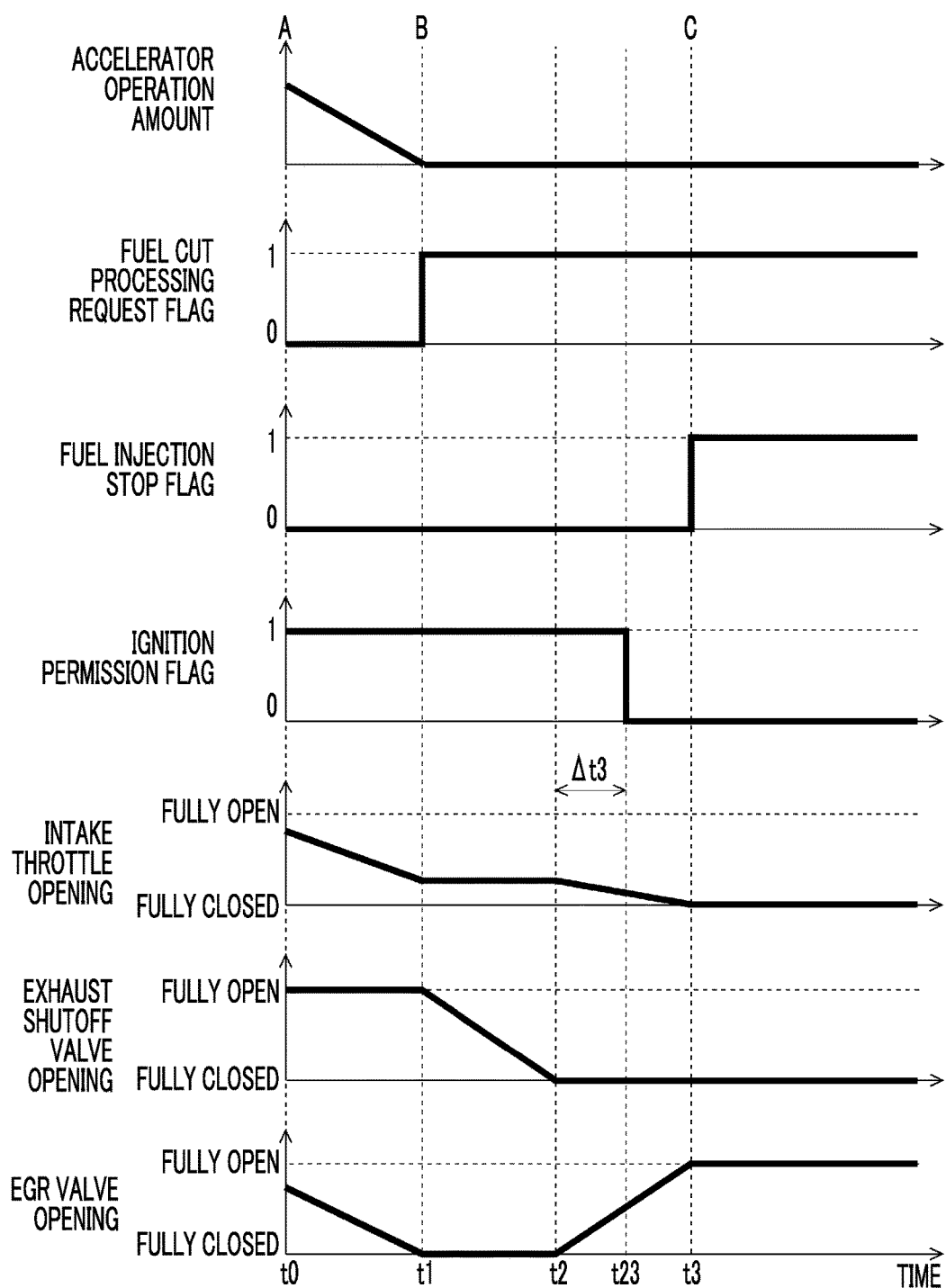

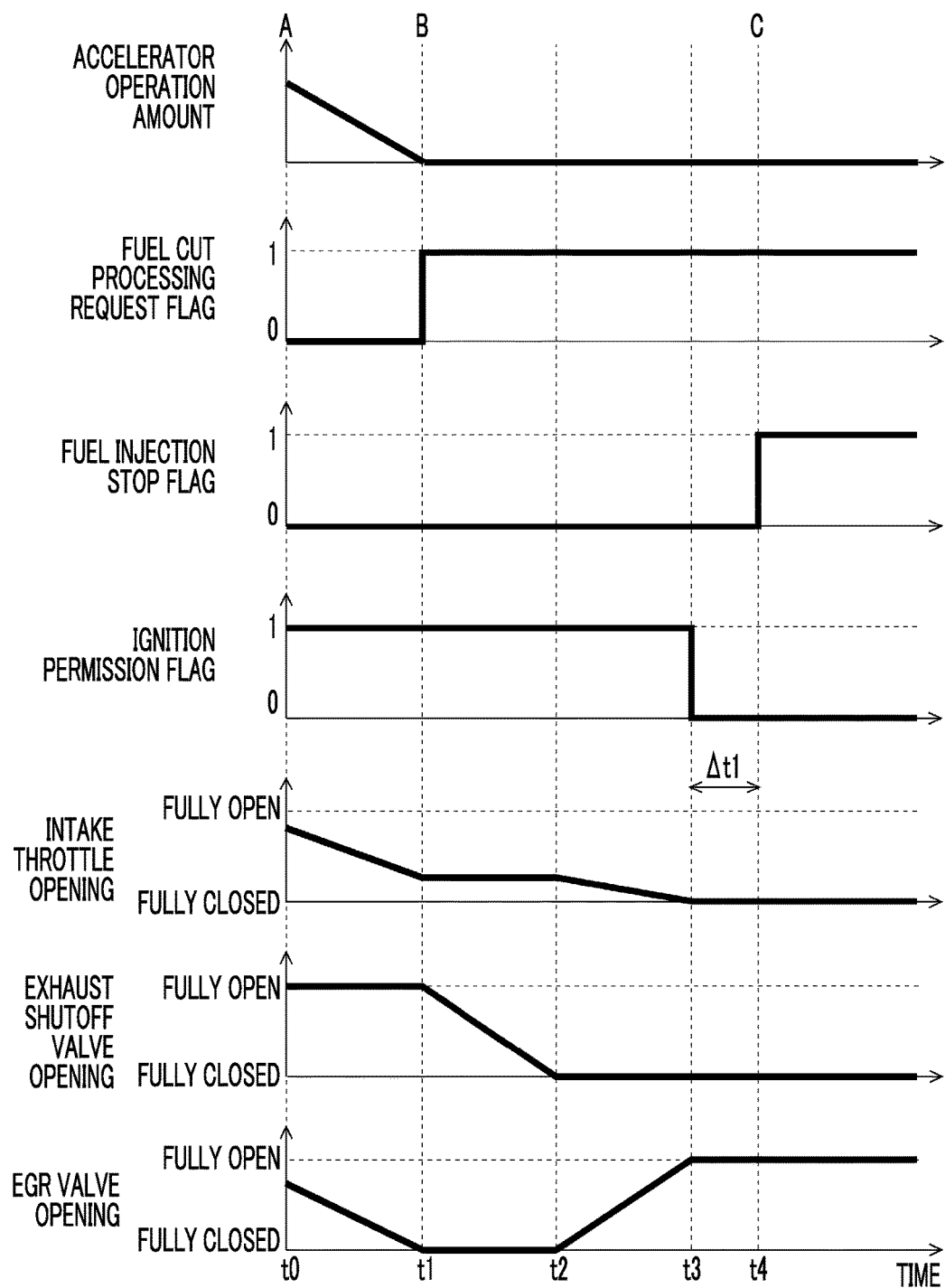

CONTROL DEVICE FOR ENGINE AND CONTROL METHOD FOR ENGINE

INCORPORATION BY REFERENCE

This application claims priority to Japanese Patent Application No. 2016-139661 filed on Jul. 14, 2016, the entire contents of which are hereby incorporated by reference.

BACKGROUND

1. Technical Field

The present disclosure relates to a control device for an engine and a control method for an engine.

2. Description of Related Art

In a natural aspiration gasoline engine, it is known that a three-way catalyst with a noble metal, such as platinum (Pt), carried thereon is used for an exhaust gas control catalyst.

Japanese Patent Application Publication No. 2007-016611 (JP 2007-016611 A) discloses a diesel engine including an EGR device and an exhaust throttle valve. The EGR device of JP 2007-016611 A is a device which circulates EGR gas as a part of exhaust gas from an exhaust passage to an intake passage. The exhaust throttle valve is a valve which controls an exhaust gas flow. JP 2007-016611 A discloses a technique in which, when fuel cut is executed, an intake throttle is fully closed, an EGR valve is fully opened, and the exhaust throttle valve is closed.

SUMMARY

In the natural aspiration gasoline engine, so-called fuel cut processing may be executed at the time of deceleration. In the fuel cut processing, fuel injection by a fuel injection valve is stopped and ignition by an ignition plug is stopped. In a case where the fuel cut processing is executed at the time of deceleration, fresh air passes through a cylinder and flows into a three-way catalyst. In this case, the noble metal carried on the three-way catalyst comes into contact with oxygen included in fresh air. Then, if such fuel cut processing is executed in a state in which the temperature of the three-way catalyst is high, the noble metal carried on the three-way catalyst is deteriorated due to oxidation.

If the noble metal carried on the three-way catalyst is deteriorated due to oxidation, the exhaust gas control performance of the three-way catalyst is degraded. Accordingly, in a case where the fuel cut processing is executed in a state in which the temperature of the three-way catalyst is high, it is desirable to suppress an inflow of oxygen into the three-way catalyst as much as possible.

In order to suppress deterioration of the noble metal due to oxidation described above, for example, if the opening of the intake throttle increases to significantly decrease the amount of fresh air introduced into the cylinder, comparatively large negative pressure is easily generated in the cylinder, and a so-called oil loss through a piston ring that lubricant oil of the natural aspiration gasoline engine enters the cylinder easily occurs. In order to suppress deterioration of the noble metal due to oxidation described above, for example, if the amount of circulation of EGR gas increases, a pumping loss of the natural aspiration gasoline engine becomes small and a sense of deceleration of a vehicle in which the natural aspiration gasoline engine is mounted is hardly secured.

In JP 2007-016611 A described above, if a fuel cut state is brought, the intake throttle is fully closed, the EGR valve is fully opened, and the exhaust throttle valve is closed. Accordingly, it is possible to control the negative pressure of the intake passage through control of an intake by closing of the intake throttle, control of an exhaust flow by closing of the exhaust throttle valve, and circulation of EGR gas by opening of the EGR valve. Until control for bringing these valves into the above-described predetermined states is completed after the execution of the fuel cut processing starts, fresh air passes through the cylinder and flows into the three-way catalyst. Accordingly, it is difficult to suitably suppress deterioration of the three-way catalyst due to oxidation of the noble metal described above.

The present disclosure discloses a control device for an engine and a control method for an engine for suppressing deterioration of a noble metal carried on a three-way catalyst in a natural aspiration gasoline engine in which an exhaust shutoff valve is disposed in an exhaust passage and EGR gas is recirculated from the exhaust passage on a downstream side of an exhaust shutoff valve to an intake passage on a downstream side of an intake throttle. In the control device and the control method described above, when execution conditions of fuel cut processing are established, in a case where the temperature of the three-way catalyst is equal to or higher than a predetermined temperature, first, the exhaust shutoff valve is closed while continuing fuel injection and ignition. Then, until the engine is brought into an intake control state in which the intake throttle is brought in a closed state and the EGR valve is brought into a predetermined open state, fuel injection by a fuel injection valve is continued, and thereafter, the fuel cut processing is executed. With this, the inflow of fresh air into the three-way catalyst when the fuel cut processing is executed is suppressed, and it is possible to suitably suppress deterioration of the noble metal carried on the three-way catalyst due to oxidation.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3B is a second view of the time chart in a case where the fuel cut processing according to Example 1 is executed;

FIG. 6A is a first view of a time chart in a case where fuel cut processing according to the modification example of the present disclosure is executed;

FIG. 6B is a second view of the time chart in a case where the fuel cut processing according to the modification example of the present disclosure is executed;

FIG. 7 is a time chart in a case where fuel cut processing according to Example 2 of the present disclosure is executed;

FIG. 8 is a time chart in a case where fuel cut processing according to Example 3 of the present disclosure is executed;

DETAILED DESCRIPTION OF EMBODIMENTS

Figure 1:
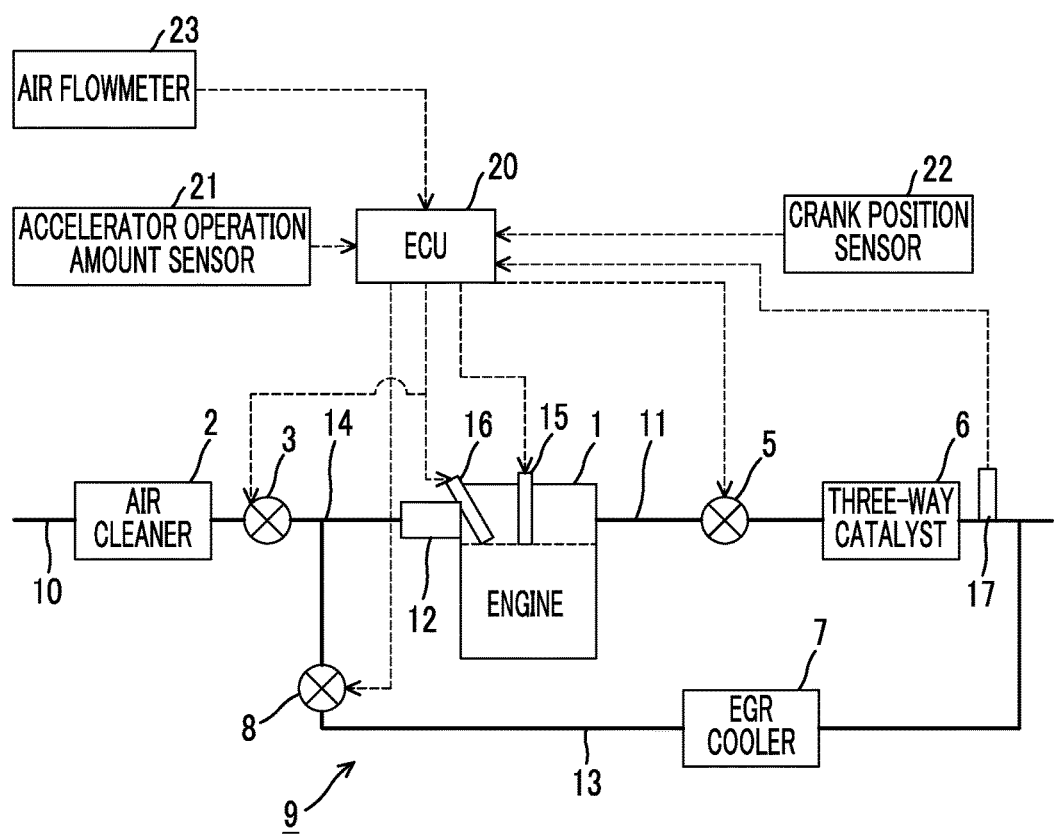
FIG. 1 is a diagram showing the schematic configuration of a natural aspiration gasoline engine according to Example 1 of the present disclosure.

A first aspect of the present disclosure is a control device for an engine. The engine is a natural aspiration gasoline engine. The engine includes an intake throttle, a fuel injection valve, an ignition plug, an exhaust shutoff valve, an EGR device, and a three-way catalyst. The intake throttle is provided in an intake passage of the engine. The exhaust shutoff valve is provided in an exhaust passage of the engine. The exhaust shutoff valve is configured to open and close the exhaust passage. The EGR device includes an EGR passage and an EGR valve. The EGR passage is configured to recirculate EGR gas as a part of exhaust gas discharged from the engine from the exhaust passage on a downstream side of the exhaust shutoff valve to the intake passage on a downstream side of the intake throttle. The EGR valve is provided in the EGR passage. The three-way catalyst is provided in the exhaust passage. The control device includes an electronic control unit. The electronic control unit is configured to execute fuel cut processing by stopping fuel injection from the fuel injection valve and stopping ignition by the ignition plug. When the electronic control unit determines that, during temperature of the engine, a temperature of the three-way catalyst is equal to or higher than a predetermined temperature and execution conditions of the fuel cut processing are established, the electronic control unit is configured to execute first control for performing control such that the exhaust shutoff valve is brought into a closed state while the fuel injection from the fuel injection valve and the ignition by the ignition plug are continued such that an air-fuel ratio of an air-fuel mixture becomes a predetermined air-fuel ratio equal to or less than a stoichiometric air-fuel ratio. When the exhaust shutoff valve reaches the closed state in the first control, the electronic control unit is configured to execute second control for performing control such that the engine is brought into an intake control state. The intake control state is a state in which the intake throttle is brought into a closed state and the EGR valve is brought into a predetermined open state. In the second control, the electronic control unit is configured to execute the fuel cut processing by stopping the ignition being continued in the first control until the engine is brought into the intake control state and stopping the fuel injection being continued in the first control after the engine is brought into the intake control state.

The engine of the present disclosure is controlled to be brought into the intake control state by the electronic control unit during the execution of the fuel cut processing when the temperature of the three-way catalyst is equal to or higher than the predetermined temperature (hereinafter, also referred to as "when the catalyst is at high temperature"). With this, during the execution of the fuel cut processing, the inflow of fresh air from the intake passage on an upstream side of the intake throttle into the intake passage on the downstream side of the intake throttle is stopped, and a comparatively large amount of EGR gas passing through the EGR passage is supplied to the intake passage on the downstream side of the intake throttle. As a result, EGR gas is guided into a cylinder of the natural aspiration gasoline engine as intake air.

The exhaust shutoff valve provided in the exhaust passage of the natural aspiration gasoline engine is configured to be switched between the fully open state and the fully closed state. In the exhaust shutoff valve, a comparatively small amount of exhaust gas flows to the exhaust passage on the downstream side of the exhaust shutoff valve through the exhaust shutoff valve structurally even in the fully closed state. Accordingly, even if the exhaust shutoff valve is fully closed, exhaust gas discharged from the cylinder at the time of the operation of the natural aspiration gasoline engine can flow out from the exhaust passage on the upstream side of the exhaust shutoff valve to the exhaust passage on the downstream side of the exhaust shutoff valve. The three-way catalyst may be provided in the exhaust passage on the upstream side of the exhaust shutoff valve or may be provided in the exhaust passage on the downstream side of the exhaust shutoff valve. Then, even in a case where the three-way catalyst is provided in the exhaust passage on the downstream side of the exhaust shutoff valve, when the exhaust shutoff valve is fully closed, exhaust gas can leak from the exhaust shutoff valve in the fully closed state and can flow into the three-way catalyst due to the above-described characteristics of the exhaust shutoff valve. In the natural aspiration gasoline engine according to the present disclosure, while the fuel cut processing is being executed when the catalyst is at high temperature, the exhaust shutoff valve is fully closed by the control device of the gasoline engine. At this time, considering that EGR gas is guided as intake air with the formation of the above-described intake control state and the inflow of fresh air into the cylinder is stopped, and intake air passes through the cylinder and is discharged to the exhaust passage as it is while the fuel cut processing is being executed, in the natural aspiration gasoline engine according to the present disclosure, while the fuel cut processing is being executed when the catalyst is at high temperature, EGR gas passing through the cylinder flows into the three-way catalyst, but, in principle, the inflow of fresh air into the three-way catalyst is stopped. In a case where the three-way catalyst is provided in the exhaust passage on the downstream side of the exhaust shutoff valve, EGR gas leaks from the exhaust shutoff valve in the fully open state and flows into the three-way catalyst. The exhaust shutoff valve is fully closed, whereby the pressure of the exhaust passage on the upstream side of the exhaust shutoff valve increases. That is, the backpressure of the natural aspiration gasoline engine increases. As a result, a pumping loss of the natural aspiration gasoline engine becomes comparatively large, and a sense of deceleration of the vehicle can be secured.

In this way, in the engine according to the present disclosure, while the fuel cut processing is being executed when the catalyst is at high temperature, the intake control state is brought, in principle, the inflow of fresh air into the three-way catalyst is stopped. In the engine, during a period from when the formation of the intake control state starts until the formation is completed, it is desirable that the inflow of oxygen into the three-way catalyst is suppress as much as possible.

According to the above-described configuration, in a case where the temperature of the three-way catalyst is equal to or higher than the predetermined temperature when the execution conditions of the fuel cut processing are established, the electronic control unit is configured to execute the first control for performing control such that the exhaust shutoff valve is brought into the closed state in a state in which the fuel injection from the fuel injection valve is continued and the ignition by the ignition plug is continued such that the air-fuel ratio of the air-fuel mixture becomes the predetermined air-fuel ratio equal to or less than the stoichiometric air-fuel ratio. Then, the electronic control unit is configured to, if the exhaust shutoff valve reaches the closed state, execute the second control for performing control such that the engine is brought into the intake control state. That is, in the control device, first, the exhaust shutoff valve is fully closed in a state in which the fuel injection and the ignition are continued by the first control, and thereafter, the formation of the intake control state starts by the second control. The exhaust shutoff valve is fully closed by the first control, whereby the backpressure of the natural aspiration gasoline engine increases, and blowback of exhaust gas and residual gas in the cylinder to the intake passage easily occurs. Then, exhaust gas to the intake passage on the downstream side of the intake throttle and residual gas in the cylinder are blown back, the inflow of fresh air from the intake passage on the upstream side of the intake throttle to the intake passage on the downstream side of the intake throttle is obstructed.

The ignition being continued theretofore is stopped until the formation of the intake control state is completed by the second control. Then, in the process until the engine is brought into the intake control state, the fuel injection being continued theretofore is continued until the air-fuel ratio of the air-fuel mixture becomes the predetermined air-fuel ratio, and after the engine is brought into the intake control state, the fuel injection being continued theretofore is stopped. The fuel injection is continued such that the air-fuel ratio of the air-fuel mixture becomes the predetermined air-fuel ratio at least until the formation of the intake control state is completed, whereby, for example, in a case where the ignition is continued until the formation of the intake control state is completed, oxygen included in fresh air is consumed by combustion in the cylinder. For this reason, the inflow of oxygen into the three-way catalyst is suppressed. For example, in a case where the ignition is stopped before the formation of the intake control state is completed and combustion is not performed in the cylinder, as described below, oxygen included in fresh air flowing into the three-way catalyst is consumed by a reaction in the three-way catalyst.

The above-described illustration will be described in detail. In a case where combustion is performed in the cylinder, while there is a comparatively large amount of EGR gas in the cylinder along with the air-fuel mixture, the temperature of sucked gas increases with blowback of exhaust gas and residual gas described above, whereby stabilization of combustion is achieved. At this time, the air-fuel ratio of the air-fuel mixture becomes the predetermined air-fuel ratio equal to or less than the stoichiometric air-fuel ratio, whereby oxygen not used in combustion is prevented from being discharged from the cylinder, and thus, the inflow of oxygen into the three-way catalyst is suppress as much as possible. In a case where combustion is not performed in the cylinder, fresh air passes through the cylinder and is discharged to the exhaust passage, and fresh air can flow into the three-way catalyst. In a case where the three-way catalyst is provided in the exhaust passage on the downstream side of the exhaust shutoff valve, fresh air leaks from the exhaust shutoff valve in the fully closed state and flows into the three-way catalyst. however, even when this happens, oxygen included in fresh air passing through the cylinder and flowing into the three-way catalyst and fuel supplied by the fuel injection being continued react with each other in the three-way catalyst, and oxygen is consumed. At this time, the air-fuel ratio of the air-fuel mixture becomes the predetermined air-fuel ratio equal to or less than the stoichiometric air-fuel ratio, oxygen is consumed quickly. Furthermore, at this time, since the inflow of fresh air from the intake passage on the upstream side of the intake throttle into the intake passage on the downstream side of the intake throttle is obstructed by blowback of exhaust gas and residual gas when the exhaust shutoff valve is fully closed, in the fuel injection in the process of the formation of the intake control state, it is possible to make the air-fuel ratio of the air-fuel mixture become the predetermined air-fuel ratio equal to or less than the stoichiometric air-fuel ratio with a comparatively small fuel injection amount. In addition, since the inflow of oxygen into the three-way catalyst is suppressed as much as possible by blowback of exhaust gas and residual gas when the exhaust shutoff valve is fully closed, the amount of oxygen reacting in the three-way catalyst is small, and a temperature increase of the three-way catalyst due to the reaction is suppressed to be low.

With the above-described configuration, during a period from when the formation of the intake control state starts until the formation is completed, the inflow of oxygen into the three-way catalyst is suppressed as much as possible. With this, it is possible to suitably suppress deterioration of a noble metal carried on the three-way catalyst due to oxidation.

In the control device, in a process until the engine is brought into the intake control state through the second control performed by the electronic control unit, the electronic control unit may be configured to stop the ignition being continued in the first control after the intake throttle starts to be closed and before the engine is brought into the intake control state, and configured to stop the fuel injection being continued in the first control when the engine is brought into the intake control state. In such a natural aspiration gasoline engine, fuel continuously injected in the process of the formation of the intake control state after the ignition is stopped is not used for combustion in the cylinder, flows into the three-way catalyst along with fresh air, and reacts with oxygen in the three-way catalyst.

In the above-described natural aspiration gasoline engine, as described above, a comparatively large amount of EGR gas is sucked into the cylinder in the process for bringing the engine into the intake control state. At this time, while stabilization of combustion is achieved by blowback of exhaust gas and residual gas, if the ignition is performed in a situation in which an EGR rate in the cylinder becomes high, combustion becomes unstable and flame-out easily occurs. Then, if flame-out occurs, torque variation of the natural aspiration gasoline engine occurs. Accordingly, in the above-described second control, in the process of the formation of the intake control state in which the EGR rate in the cylinder becomes comparatively high, before the formation of the intake control state is completed, the ignition being continued is stopped. Then, the fuel injection is continued until the formation of the intake control state is completed, and a reaction of fuel flowing into the three-way catalyst and oxygen included in fresh air flowing into the three-way catalyst is performed in the three-way catalyst. With this, it is possible to consume oxygen included in fresh air flowing into the three-way catalyst while suppressing the occurrence of torque variation of the natural aspiration gasoline engine. Therefore, it is possible to suitably suppress deterioration of a noble metal carried on the three-way catalyst due to oxidation.

In the control device, in the second control, the electronic control unit may be configured to stop the ignition being continued in the first control until the engine is brought into the intake control state, and configured to stop the fuel injection being continued in the first control when a first predetermined period elapses after the engine is brought into the intake control state. In such an engine, fuel which is continuously injected even during a period until the first predetermined period elapses after the formation of the intake control state is completed is not used for combustion in the cylinder and flows into the three-way catalyst.

In the above-described natural aspiration gasoline engine, during a certain period of time (at this time, the intake control state is formed and the ignition is stopped) after the intake control state is formed, fresh air (hereinafter, referred to as "remaining fresh air") which remains in the intake passage connected to the cylinder on the downstream side of the intake throttle may be sucked into the cylinder along with EGR gas, may be discharged to the exhaust passage as it is, and may flow into the three-way catalyst. This is not preferable from the viewpoint of deterioration of a noble metal carried on the three-way catalyst due to oxidation. Accordingly, in the above-described second control, the fuel injection is continued until the first predetermined period, which is a period in which remaining fresh air can flow into the three-way catalyst, elapses, and a reaction of oxygen included in remaining fresh air passing through the cylinder and flowing into the three-way catalyst and fuel supplied by the fuel injection being continued is performed in the three-way catalyst. With this, it is possible to suppress deterioration of a noble metal due to oxidation resulting from the inflow of remaining fresh air into the three-way catalyst.

In the control device, the exhaust shutoff valve, the intake throttle, and the EGR valve may be controlled and a fuel injection start time by the fuel injection valve and an ignition start time by the ignition plug may be controlled in recovery processing for recovering from the fuel cut processing by restarting the ignition and the fuel injection.

In the control device, the electronic control unit may be configured to execute recovery processing from the fuel cut processing. The recovery processing may be processing for bringing the exhaust shutoff valve into an open state, opening the intake throttle, and bringing the EGR valve into a closed state. The electronic control unit may be configured to start fuel injection from the fuel injection valve in response to the start of opening of the intake throttle in the recovery processing. The electronic control unit is configured to start ignition by the ignition plug when the exhaust shutoff valve is brought into the open state in the recovery processing and when a second predetermined period elapses after opening of the intake throttle starts. According to the above-described configuration, the exhaust shutoff valve is fully opened, the intake throttle is opened, and the EGR valve is fully closed by the recovery processing, whereby the inflow of fresh air from the intake passage on the upstream side of the intake throttle into the intake passage on the downstream side of the intake throttle starts, and circulation of EGR gas from the EGR passage is stopped. Accordingly, fresh air is guided into the cylinder as intake air. At this time, the exhaust shutoff valve is fully opened, whereby blowback of exhaust gas and residual gas described above is suppressed, and the inflow of fresh air into the intake passage on the downstream side of the intake throttle is promoted.

In the above-described natural aspiration gasoline engine, if fresh air guided into the cylinder as intake air flows into the three-way catalyst as it is, deterioration of a noble metal due to oxidation may be promoted. Accordingly, in the above-described recovery processing, the fuel injection from the fuel injection valve starts in response to the start of opening of the intake throttle.

In the engine according to the present disclosure, while the fuel cut processing is being executed when the catalyst is at high temperature, since the engine is brought into the intake control state, the intake passage connected to the cylinder on the downstream side of the intake throttle is filled with EGR gas. Accordingly, in the recovery processing from such a state, when the intake throttle is opened and the EGR valve is fully closed, while the supply of fresh air starts with the start of opening of the intake throttle and circulation of EGR gas from the EGR passage is stopped with the EGR valve fully closed, the amount of EGR gas sucked into the cylinder easily increases until EGR gas with which the intake passage on the downstream side of the intake throttle is filled is scavenged by fresh air from the intake passage on the upstream side of the intake throttle.

If the above-described second predetermined period is defined as a period from when opening of the intake throttle starts until scavenging of EGR gas by fresh air is completed, the amount of EGR gas which is sucked into the cylinder easily increases until the second predetermined period elapses after opening of the intake throttle starts. If the ignition by the ignition plug is performed in such a situation, there is a concern that torque variation due to flame-out occurs. Accordingly, in the above-described recovery processing, the ignition by the ignition plug starts when the exhaust shutoff valve is fully opened and when the second predetermined period elapses after opening of the intake throttle starts. That is, the ignition by the ignition plug is stopped until scavenging of EGR gas by fresh air is completed. During a period from when opening of the intake throttle starts until the ignition starts, as described above, fuel from the fuel injection valve in which the fuel injection starts and fresh air are not used for combustion in the cylinder and flow into the three-way catalyst, and fuel flowing into the three-way catalyst and oxygen included in fresh air flowing into the three-way catalyst react with each other in the three-way catalyst. With this, it is possible to consume oxygen included in fresh air flowing into the three-way catalyst while suppressing the occurrence of torque variation of the natural aspiration gasoline engine. Therefore, it is possible to suitably suppress deterioration of a noble metal carried on the three-way catalyst due to oxidation.

A second aspect of the present disclosure is a control method for an engine. The engine is a natural aspiration gasoline engine. The engine includes an intake throttle, a fuel injection valve, an ignition plug, an exhaust shutoff valve, an EGR device, a three-way catalyst, and an electronic control unit. The intake throttle is provided in an intake passage of the engine. The exhaust shutoff valve is provided in an exhaust passage of the engine. The exhaust shutoff valve is configured to open and close the exhaust passage. The EGR device includes an EGR passage and an EGR valve. The EGR passage is configured to recirculate EGR gas as a part of exhaust gas discharged from the engine from the exhaust passage on a downstream side of the exhaust shutoff valve to the intake passage on a downstream side of the intake throttle. The EGR valve is provided in the EGR passage. The three-way catalyst is provided in the exhaust passage. The electronic control unit is configured to execute fuel cut processing by stopping fuel injection from the fuel injection valve and stopping ignition by the ignition plug. The control method includes: when the electronic control unit determines that, during deceleration of the engine, a temperature of the three-way catalyst is equal to or higher than a predetermined temperature and execution conditions of the fuel cut processing are established, executing, by the electronic control unit, first control for performing control such that the exhaust shutoff valve is brought into a closed state while the fuel injection from the fuel injection valve and the ignition by the ignition plug are continued such that an air-fuel ratio of an air-fuel mixture becomes a predetermined air-fuel ratio equal to or less than a stoichiometric air-fuel ratio; when the exhaust shutoff valve reaches the closed state by the first control, executing, by the electronic control unit, second control for performing control such that the engine is brought into an intake control state, the intake control state being a state in which the intake throttle is brought into a closed state and the EGR valve is brought into a predetermined open state; and in the second control, executing, by the electronic control unit, the fuel cut processing by stopping the ignition being continued in the first control until the engine is brought into the intake control state and stopping the fuel injection being continued in the first control after the engine is brought into the intake control state.

As above, in the control device for an engine, the ignition is stopped until the exhaust shutoff valve is fully opened and the second predetermined period elapses after opening of the intake throttle starts, whereby it is possible to suppress the occurrence of torque variation of the natural aspiration gasoline engine. In addition, the fuel injection starts in response to the start of opening of the intake throttle, and oxygen included in fresh air flowing into the three-way catalyst is consumed, whereby it is possible to suitably suppress deterioration of a noble metal carried on the three-way catalyst due to oxidation.

Hereinafter, a mode for carrying out the disclosure will be exemplarily described based on examples referring to the drawings. However, the dimensions, materials, shapes, relative arrangements, and the like of components described in the examples are not intended to limit the scope of the disclosure to these alone in particular as long as there are no specific statements.

Example 1

First, Example 1 of the present disclosure will be described based on FIGS. 1 to 4. FIG. 1 is a diagram showing the schematic configuration of a natural aspiration gasoline engine (hereinafter, simply referred to as a "gasoline engine") 1 to which the present disclosure is applied. The gasoline engine 1 is a cylinder-injection spark-ignition type internal combustion engine for vehicle drive, and includes an ignition plug 15 and a fuel injection valve 16. An intake system of the gasoline engine 1 is configured such that natural aspiration becomes possible. Specifically, in an intake passage 10 connected to a cylinder of the gasoline engine 1 on a downstream side of an air cleaner 2, an intake throttle 3 and an intake manifold 12 are disposed in order according to an intake flow.

In an exhaust system of the gasoline engine 1, in an exhaust passage 11 connected to the cylinder of the gasoline engine 1, an exhaust shutoff valve 5 and a three-way catalyst 6 are disposed in order according to an exhaust flow. The exhaust shutoff valve 5 is configured to be opened and closed while switching between an open state (a fully open state) and a closed state (a fully closed state). Even if the exhaust shutoff valve 5 is fully closed structurally, a comparatively small amount of exhaust gas flows out to the exhaust passage 11 on a downstream side of the exhaust shutoff valve 5 through the exhaust shutoff valve 5. For example, when the exhaust shutoff valve 5 is fully closed, there is an exhaust flow passage corresponding to $\Phi 1$ mm to $\Phi 2$ mm in the exhaust shutoff valve 5. Accordingly, even if the exhaust shutoff valve 5 is fully closed, exhaust gas discharged from the cylinder at the time of the operation of the gasoline engine 1 can flow out from the exhaust passage 11 on an upstream side of the exhaust shutoff valve 5 to the exhaust passage 11 on the downstream side of the exhaust shutoff valve 5. A noble metal (not shown) is carried on the three-way catalyst 6. In FIG. 1, while the three-way catalyst 6 is provided in the exhaust passage 11 on the downstream side of the exhaust shutoff valve 5, in place of this, the three-way catalyst 6 may be provided in the exhaust passage 11 on the upstream side of the exhaust shutoff valve 5. In FIG. 1, an EGR passage 13 is configured such that one end of the EGR passage 13 is connected to the exhaust passage 11 on a downstream side of the three-way catalyst 6, and the other end of the EGR passage 13 is connected to the intake passage 10 at a junction 14 between the intake throttle 3 and the intake manifold 12. A part of exhaust gas flowing in the exhaust passage 11 is circulated to the intake passage 10 as EGR gas by the EGR passage 13. In the EGR passage 13, an EGR cooler 7 which cools EGR gas and an EGR valve 8 which controls the flow rate (hereinafter, referred to as an "EGR amount") of EGR gas to be circulated are disposed according to the flow of circulation of EGR gas. The EGR passage 13, the EGR cooler 7, and the EGR valve 8 form an EGR device 9. In FIG. 1, while the EGR passage 13 is connected to the exhaust passage 11 on the downstream side of the three-way catalyst 6, in place of this, the EGR passage 13 may be connected to the exhaust passage 11 on an upstream side of the three-way catalyst 6. However, in a case where the EGR passage 13 is connected to the exhaust passage 11 on the upstream side of the three-way catalyst 6, the EGR passage 13 is connected to the exhaust passage 11 between the exhaust shutoff valve 5 and the three-way catalyst 6.

An electronic control unit (ECU) 20 is mounted in the gasoline engine 1, and various kinds of control are executed in the gasoline engine 1. In the gasoline engine 1, an accelerator operation amount sensor 21 is electrically connected to the ECU 20, and the ECU 20 receives a signal according to an accelerator operation amount and calculates an engine load or the like required for the gasoline engine 1 from the received signal. A crank position sensor 22 is electrically connected to the ECU 20, and the ECU 20 receives a signal according to a rotation angle of an output shaft of the gasoline engine 1 and calculates an engine rotation speed or the like of the gasoline engine 1. The ECU 20 is electrically connected to an air flowmeter 23 provided in the intake passage 10, such that the flow rate (hereinafter, referred to as a "fresh air flow rate") of fresh air flowing in the intake passage 10 can be detected. The ECU 20 is electrically connected to an exhaust temperature sensor 17 provided in the exhaust passage 11 on the downstream side of the three-way catalyst 6, and the ECU 20 receives a signal according to the temperature of exhaust gas and estimates the temperature (hereinafter, referred to as a "catalyst temperature") of the three-way catalyst 6.

Various devices, such as the intake throttle 3, the exhaust shutoff valve 5, the EGR valve 8, the ignition plug 15, and the fuel injection valve 16, are electrically connected to the ECU 20. The opening of the intake throttle 3, an ignition time of the ignition plug 15, a fuel injection amount or a fuel injection time from the fuel injection valve 16 in the gasoline engine 1, and the like are controlled by the ECU 20, and various other kinds of control in the gasoline engine 1 are executed. For example, the ECU 20 controls the fuel injection amount from the fuel injection valve 16 such that an air-fuel ratio of an air-fuel mixture in the cylinder of the gasoline engine 1 becomes a stoichiometric air-fuel ratio or an air-fuel ratio near the stoichiometric air-fuel ratio at the time of normal operation.

In the gasoline engine 1, at the time of deceleration of the gasoline engine 1 (also referred to as at the time of deceleration of a vehicle), the ECU 20 stops fuel injection by the fuel injection valve 16 and stops ignition of the ignition plug 15. That is, "fuel cut processing" is executed by the ECU 20. Then, the fuel cut processing is executed, for example, when the accelerator operation amount is zero and the engine rotation speed is equal to or higher than a predetermined speed. In the gasoline engine 1, at the time of the execution of the fuel cut processing, when the engine rotation speed of the gasoline engine 1 becomes the predetermined speed or when the accelerator operation amount is greater than zero by a driver's operation, the ECU 20 starts the fuel injection by the fuel injection valve 16 and the ignition by the ignition plug 15. That is, "recovery processing" is executed.

On the other hand, in the engine of JP 2007-016611 A, if the fuel cut processing is executed, fresh air passes through the cylinder and flows into the three-way catalyst 6. In this case, the noble metal carried on the three-way catalyst 6 comes into contact with oxygen included in fresh air. Then, if the fuel cut processing is executed in a state in which the catalyst temperature is comparatively high, the noble metal carried on the three-way catalyst 6 may be oxidized by fresh air flowing into the three-way catalyst 6 and may be deteriorated.

Accordingly, in the gasoline engine 1 of this example, in a case where the noble metal is likely to be deteriorated due to oxidation, that is, while the fuel cut processing is being executed when the catalyst temperature is equal to or higher than the predetermined temperature, the ECU 20 which is a control device of the gasoline engine 1 forms an "intake control state" in which the intake throttle 3 is brought into a fully closed state and the EGR valve 8 is brought into a predetermined open state. The exhaust shutoff valve 5 is fully closed. The predetermined temperature is defined as a catalyst temperature at which, if fresh air flows into the three-way catalyst 6 and the noble metal carried on the three-way catalyst 6 comes into contact with oxygen included in fresh air, the noble metal may be deteriorated due to oxidation, and for example, in this example, the predetermined temperature is determined to 750° C. Then, the predetermined temperature determined in advance based on an experiment or the like is stored in a ROM of the ECU 20.

In the gasoline engine 1 configured as above, while the fuel cut processing is being executed, EGR gas is guided as intake air, and in principle, the inflow of fresh air into the three-way catalyst 6 is stopped. With this, it is possible to suppress deterioration of the noble metal due to oxidation resulting from the inflow of fresh air into the three-way catalyst 6. However, when the fuel cut processing is about to be executed in a case where the catalyst temperature is equal to or higher than the predetermined temperature, in a process in which the intake control state is formed for the intake throttle 3 and the EGR valve 8 by the ECU 20, oxygen included in fresh air is likely to flow into the three-way catalyst 6.

Accordingly, during a period from when the formation of the intake control state starts until the formation is completed, in order to suppress the inflow of oxygen into the three-way catalyst 6 as much as possible, in a case where the temperature of the three-way catalyst 6 is equal to or higher than the predetermined temperature when execution conditions of the fuel cut processing are established, the ECU 20 which is a control device of the gasoline engine 1 of this example fully closes the exhaust shutoff valve 5 in a state in which the fuel injection from the fuel injection valve 16 is continued and the ignition by the ignition plug 15 is continued such that the air-fuel ratio of the air-fuel mixture becomes a predetermined air-fuel ratio equal to or less than the stoichiometric air-fuel ratio. Then, the ECU 20 focus the intake control state if the exhaust shutoff valve 5 reaches a fully closed state. That is, the ECU 20 first fully closes the exhaust shutoff valve 5 in a state in which the fuel injection and the ignition are continued, and then, starts the formation of the intake control state. Then, the ECU 20 continues the fuel injection being performed theretofore such that the air-fuel ratio of the air-fuel mixture becomes the predetermined air-fuel ratio until the formation of the intake control state is completed (until the engine is brought into the intake control state). In this example, the ECU 20 executes, as an example of first control, control for fully closing the exhaust shutoff valve 5 in a state in which the fuel injection and the ignition are continued. The ECU 20 executes, as an example of second control, control for, when the exhaust shutoff valve 5 reaches the fully closed state, forming the intake control state, stopping the ignition being continued until the formation of the intake control state is completed, stopping the fuel injection being continued after the formation of the intake control state is completed, and executing the fuel cut processing.

Figure 2:
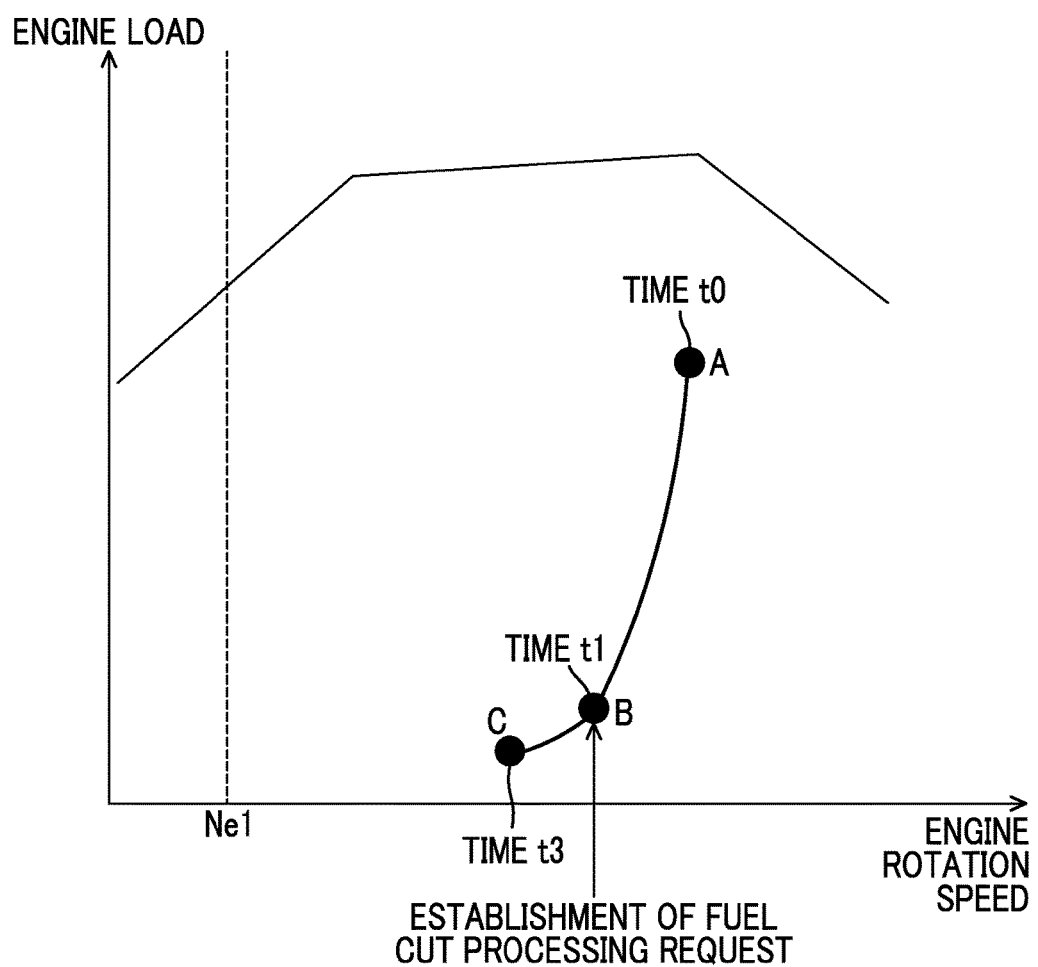
FIG. 2 is a diagram showing an operation state of the natural aspiration gasoline engine in a case where transition is made from normal operation to execution of fuel cut processing.
Figure 3A:
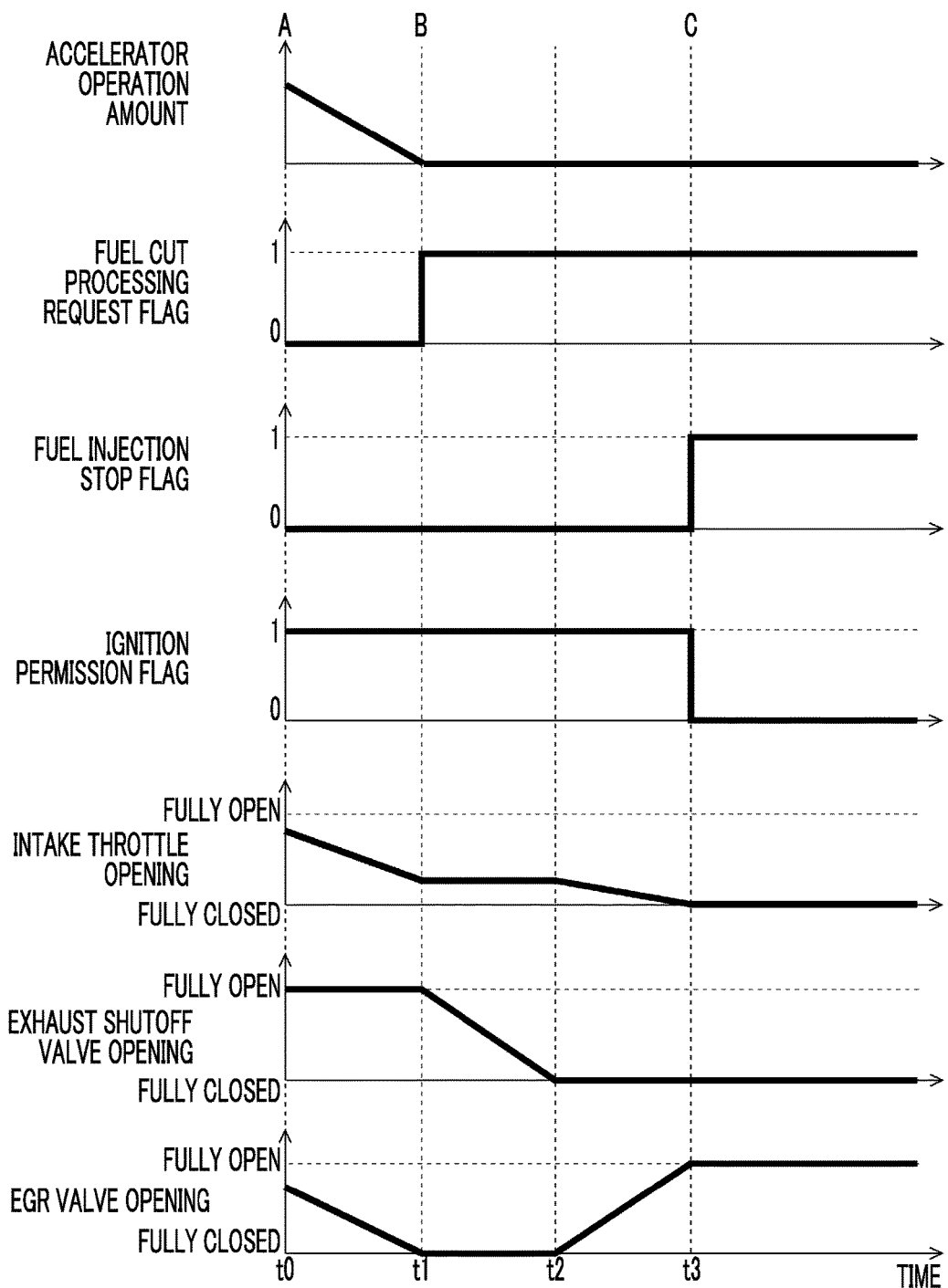
FIG. 3A is a first view of a time chart in a case where fuel cut processing according to Example 1 is executed.

The fuel cut processing which is performed by the control device of the gasoline engine 1 of this example will be described using an operation state of the gasoline engine 1 shown in FIG. 2 and time charts shown in FIGS. 3A and 3B. FIG. 2 is a diagram showing an operation state of the gasoline engine 1 in a case where transition is made from normal operation to execution of fuel cut processing. A point A shown in FIG. 2 is a point indicating the operation state of the gasoline engine 1 corresponding to a time t0 of time charts described below, a point B is a point indicating the operation state of the gasoline engine 1 corresponding to a time t1 of the time charts described below, and a point C is a point indicating the operation state of the gasoline engine 1 corresponding to a time t3 of the time charts described below. FIGS. 3A and 3B are time charts in a case where the fuel cut processing according to this example is executed. FIG. 3A shows transitions of an accelerator operation amount, a fuel cut processing request flag, a fuel injection stop flag, an ignition permission flag, the opening of the intake throttle 3, the opening of the exhaust shutoff valve 5, and the opening of the EGR valve 8 in a process in which the gasoline engine 1 is decelerating. FIG. 3B shows transitions of the opening of the intake throttle 3, the opening of the exhaust shutoff valve 5, the opening of the EGR valve 8, pressure (hereinafter, referred to as "intake throttle downstream pressure") in the intake passage 10 on the downstream side of the intake throttle 3, pressure (hereinafter, referred to as "exhaust shutoff valve upstream pressure") in the exhaust passage 11 on the upstream side of the exhaust shutoff valve 5, an EGR amount, and a fresh air flow rate in a process in which the gasoline engine 1 is decelerating. For description, the transitions of the opening of the intake throttle 3, the opening of the exhaust shutoff valve 5, and the opening of the EGR valve 8 shown in FIG. 3A are also shown in FIG. 3B.

At the time t0 shown in FIG. 3A, the gasoline engine 1 performs normal operation, and the operation state of the gasoline engine 1 at this time is represented by the point A shown in FIG. 2. Then, as shown in FIG. 3A, in a process in which the accelerator operation amount is decreasing and the gasoline engine 1 is decelerating, the opening of the intake throttle 3 is decreasing with a decrease in the accelerator operation amount, whereby the gasoline engine 1 is decelerating. In this case, the opening of the EGR valve 8 is decreasing with a decrease in the opening of the intake throttle 3. Then, if the accelerator operation amount is decreasing and the accelerator is not operated at the time t1, the operation state of the gasoline engine 1 becomes the operation state represented by the point B shown in FIG. 2. At this time, as shown in FIG. 3A, the EGR valve 8 is fully closed, and as shown in FIG. 3B, the EGR amount becomes zero. This control is normal control which is executed at the time of normal operation of the gasoline engine 1. Then, at the time t1 at which the accelerator is not operated, the accelerator operation amount is zero, and at this time, the operation state of the gasoline engine 1 is the operation state represented by the point B shown in FIG. 2 and the engine rotation speed is equal to or higher than a predetermined speed Ne1 shown in FIG. 2. For this reason, a request for fuel cut processing (hereinafter, referred to as a "fuel cut processing request") is established, and at the time t1, the fuel cut processing request flag is set to one. The fuel cut processing request flag is a flag which is set to one in a case where there is the fuel cut processing request and is set to zero in a case where there is no fuel cut processing request. Here, "when the fuel cut processing request flag is set to one (when the fuel cut processing request is established)" is an example of "when execution conditions of fuel cut processing are established" in the present disclosure.

If the fuel cut processing request flag is set to one in a case where the catalyst temperature is equal to or higher than the predetermined temperature, first, as shown in FIG. 3A, at the time t1, control for fully closing the exhaust shutoff valve 5 starts, and at a time t2, the exhaust shutoff valve 5 is fully closed. Since the exhaust shutoff valve 5 is configured to be opened and closed while switching between the fully open state and the fully closed state, by the above-described control, the exhaust shutoff valve 5 is changed from the fully open state to the fully closed state. In regard to the intake throttle 3 and the EGR valve 8, the control state at the time t1 is maintained during a period from the time t1 to the time t2. That is, the formation of the intake control state does not start until the exhaust shutoff valve 5 is fully closed. Then, during a period from the time t1 to the time t2, as shown in FIG. 3B, the exhaust shutoff valve upstream pressure increases in response to closing of the exhaust shutoff valve 5, and at the time t2, the exhaust shutoff valve upstream pressure increases greater than atmospheric pressure. In addition, blowback of exhaust gas and residual gas in the cylinder to the intake passage 10 occurs with an increase in exhaust shutoff valve upstream pressure, and even though the opening of the intake throttle 3 is constant, the intake throttle downstream pressure increases. Then, the inflow of fresh air from the intake passage 10 on the upstream side of the intake throttle 3 to the intake passage 10 on the downstream side of the intake throttle 3 is obstructed by an increase in intake throttle downstream pressure, and during a period from the time t1 to the time t2, even though the opening of the intake throttle 3 is constant, the fresh air flow rate decreases.

Next, as shown in FIG. 3A, at the time t2 at which the exhaust shutoff valve 5 is fully closed, control of the intake throttle 3 and the EGR valve 8 starts in order to form the intake control state. In regard to the intake throttle 3, at the time t2, control for fully closing the intake throttle 3 starts, and at the time t3, the intake throttle 3 is fully closed. In regard to the EGR valve 8, at the time t2, control for fully opening the EGR valve 8 starts, and at the time t3, the EGR valve is fully opened. In the control processing shown in FIG. 3A, the EGR valve 8 is brought into the fully open state, whereby the EGR valve 8 is brought into the above-described predetermined open state. That is, at the time t3, the formation of the intake control state is completed. As shown in FIG. 3A, during a period of the time t2 to the time t3 as the process of the formation of the intake control state, the fuel injection stop flag is set to zero and the fuel injection by the fuel injection valve 16 is continued. At this time, the fuel injection is continued such that the air-fuel ratio of the air-fuel mixture becomes the predetermined air-fuel ratio equal to or less than the stoichiometric air-fuel ratio. In this way, in the control processing shown in FIG. 3A, the formation of the intake control state starts after the exhaust shutoff valve 5 is fully closed, and the fuel injection by the fuel injection valve 16 is continued until the formation of the intake control state is completed. At this time, the ignition permission flag is set to one and the ignition by the ignition plug 15 is continued. Accordingly, oxygen included in fresh air sucked into the cylinder is consumed by combustion in the cylinder, and thus, the inflow of oxygen into the three-way catalyst 6 is suppressed. At this time, the air-fuel ratio of the air-fuel mixture becomes the predetermined air-fuel ratio equal to or less than the stoichiometric air-fuel ratio, oxygen which is not used for combustion is prevented from being discharged from the cylinder, and thus, the inflow of oxygen into the three-way catalyst 6 is suppressed as much as possible. At this time, the inflow of fresh air from the intake passage 10 on the upstream side of the intake throttle 3 to the intake passage 10 on the downstream side of the intake throttle 3 is obstructed by blowback of exhaust gas and residual gas when the exhaust shutoff valve 5 is fully closed. For this reason, in the fuel injection in the process of the formation of the intake control state, it is possible to make the air-fuel ratio of the air-fuel mixture become the predetermined air-fuel ratio equal to or less than the stoichiometric air-fuel ratio with a comparatively small fuel injection amount. The above-described predetermined air-fuel ratio is defined as an air-fuel ratio at which oxygen is consumed by combustion performed in the cylinder and the inflow of oxygen into the three-way catalyst 6 is suppressed as much as possible. Then, the above-described predetermined air-fuel ratio is determined in advance based on an experiment or the like and stored in the ROM of the ECU 20. The fuel injection stop flag is set to one in a case where the stop of the fuel injection by the fuel injection valve 16 is executed and is set to zero in a case where the stop of the fuel injection is not executed, and is initialized to zero when the gasoline engine 1 starts. The ignition permission flag is set to one in a case where the ignition by the ignition plug 15 is permitted and is set to zero in a case where the ignition is not permitted, and is initialized to one when the gasoline engine 1 starts.

As shown in FIG. 3B, during a period from the time t2 to the time t3, the EGR amount increases, and the fresh air flow rate decreases. Then, at the time t3 at which the intake throttle 3 is fully closed, the fresh air flow rate becomes zero. In the gasoline engine 1, in a state in which the EGR amount is relatively large and the fresh air flow rate is relatively small (that is, a state in which the EGR rate is high), combustion in the cylinder becomes unstable and flame-out easily occurs. Then, if flame-out occurs, torque variation of the gasoline engine 1 occurs. Accordingly, in the control processing shown in FIG. 3A, the formation of the intake control state starts after the exhaust shutoff valve 5 is fully closed, and the temperature of sucked gas increases by blowback of exhaust gas and residual gas in the process of the formation of the intake control state, whereby stabilization of combustion is achieved during a period from the time t2 to the time t3 in which the EGR rate becomes comparatively high. As shown in FIG. 3B, during a period from the time t2 to the time t3, the intake throttle downstream pressure increases with an increase in the EGR amount, and at the time t3, the negative pressure of the intake passage 10 on the downstream side of the intake throttle 3 becomes comparatively small. At this time, the exhaust shutoff valve upstream pressure increases greater than the atmospheric pressure. For this reason, while the negative pressure of the intake passage 10 on the downstream side of the intake throttle 3 is comparatively small, a pumping loss of the gasoline engine 1 becomes comparatively large, and a sense of deceleration of the vehicle can be secured. Since the EGR valve 8 has a characteristic that a comparatively large amount of EGR gas flows from the start of opening in a process of being changed from the fully closed state to the fully open state during the period from the time t2 to the time t3, the EGR amount significantly increases at the beginning of the period.

Based on the above, the control which is executed during a period from the time t1 to the time t3 will be collectively described based on FIG. 2. As described above, if the accelerator is not operated at the time t1, the operation state of the gasoline engine 1 becomes the operation state represented by the point B shown in FIG. 2. At this time, the fuel cut processing request is established. After the time t1, the exhaust shutoff valve upstream pressure increases in response to fully closing of the exhaust shutoff valve 5, and the engine load and the engine rotation speed decrease with a decrease in the fresh air flow rate due to blowback of exhaust gas and residual gas. The engine rotation speed decrease with an increase in the pumping loss due to an increase in the backpressure of the gasoline engine 1. If the exhaust shutoff valve 5 reaches the fully closed state, the engine load and the engine rotation speed decrease with a decrease in the fresh air flow rate accompanied by the formation of the intake control state. Then, if the formation of the intake control state is completed at the time t3, the operation state of the gasoline engine 1 becomes the operation state represented by the point C shown in FIG. 2.

Next, control which is executed after the time t3 will be described based on FIGS. 3A and 3B. As shown in FIG. 3A, at the time t3, the fuel injection stop flag is set to one, the ignition permission flag is set to zero, and the fuel injection by the fuel injection valve 16 and the ignition by the ignition plug 15 being continued theretofore are stopped. Then, after the time t3 shown in FIG. 3A, the fuel cut processing is being executed. At this time, the exhaust shutoff valve 5 is fully closed, and the intake control state is formed for the intake throttle 3 and the EGR valve 8. As shown in FIG. 3B, after the time t3, the formation of the intake control state is completed, and the fresh air flow rate is zero. That is, the inflow of fresh air into the three-way catalyst 6 is stopped. In addition, the exhaust shutoff valve upstream pressure increases greater than the atmospheric pressure, and a sense of deceleration of the vehicle can be secured.

As described above, the control device of the gasoline engine 1 according to this example suppresses the inflow of oxygen into the three-way catalyst 6 in the process of the formation of the intake control state as much as possible. With this, it is possible to suitably suppress deterioration of the noble metal carried on the three-way catalyst 6 due to oxidation.

Figure 4:
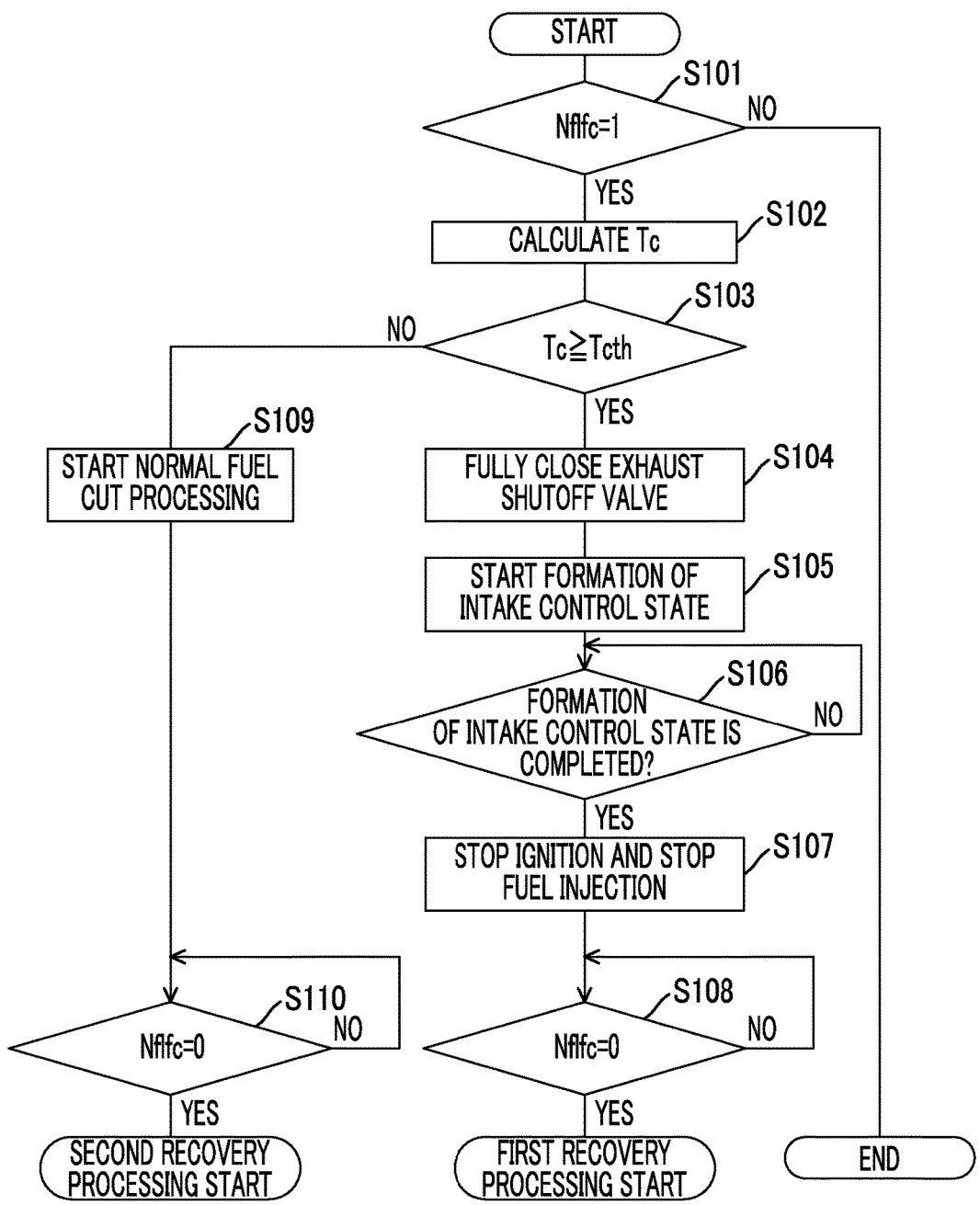
FIG. 4 is a flowchart showing a control flow which is executed by a control device of a natural aspiration gasoline engine according to Example 1.

A control flow which is executed by the control device of the gasoline engine 1 according to this example will be described based on FIG. 4. FIG. 4 is a flowchart showing the flow of control according to fuel cut processing in the control device of the gasoline engine 1 according to this example. In this example, this flow is repeatedly executed by the ECU 20 in a predetermined calculation cycle during the operation of the gasoline engine 1. Setting of a fuel cut processing request flag Nflfc is performed by the ECU 20 according to a known flow different from this flow, and the value of the fuel cut processing request flag Nflfc is stored in the ROM of the ECU 20.

In this flow, first, in S101, it is determined whether or not the fuel cut processing request flag Nflfc is one. In S101, the value of the fuel cut processing request flag Nflfc which is set according to the known flow different from this flow and stored in the ROM of the ECU 20 is read and the above-described determination is performed. The fuel cut processing request is established, for example, when the accelerator operation amount is zero and the engine rotation speed is equal to or higher than a predetermined speed. As shown in FIG. 3A described above, at the time t1, if the accelerator operation amount becomes zero, the fuel cut processing request flag Nflfc is set to one. Then, in a case where the determination in S101 is affirmative, that is, in a case where there is the fuel cut processing request, the ECU 20 progresses to processing of S102, and in a case where the determination in S101 is negative, that is, in a case where there is no fuel cut processing request, the execution of this flow ends.

In a case where the determination in S101 is affirmative, next, in S102, a catalyst temperature Tc is calculated. In S102, the catalyst temperature Tc is calculated based on an output signal of the exhaust temperature sensor 17. In the calculation of the catalyst temperature Tc, the catalyst temperature Tc may be calculated based on the engine rotation speed and the engine load, without depending on the exhaust temperature sensor 17. In the ROM of the ECU 20, the correlation of the catalyst temperature Tc, and the engine rotation speed and the engine load is stored in advance in the form of a map or a function. In S102, the catalyst temperature Tc may be calculated based on the correlation.

Next, in S103, it is determined whether or not the catalyst temperature Tc calculated in S102 is equal to or higher than a determination threshold Tcth. The determination threshold Tcth is the above-described predetermined temperature, and is determined in advance based on an experiment or the like and stored in the ROM of the ECU 20. Then, in a case where the determination in S103 is affirmative, the ECU 20 progresses to processing of S104, and in a case where the determination in S103 is negative, the ECU 20 progresses to processing of S109.

In a case where the determination in S103 is affirmative, in S104, the exhaust shutoff valve 5 is fully closed. As described above, since the exhaust shutoff valve 5 is configured to be opened and closed while switching between the fully open state and the fully closed state, in S104, the exhaust shutoff valve 5 is changed from the fully open state to the fully closed state. The processing of S104 corresponds to the control which is executed during the period from the time t1 to the time t2 shown in FIG. 3A described above.

Then, after the exhaust shutoff valve 5 is fully closed in S104, in S105, the formation of the intake control state starts. In S105, control for forming the intake control state for the intake throttle 3 and the EGR valve 8 starts. The processing of S105 corresponds to the control which is executed at the time t2 shown in FIG. 3A described above. During the control, the fuel injection and the ignition are continued. Next, in S106, it is determined whether or not the formation of the intake control state is completed. Then, in a case where the determination in S106 is affirmative, the ECU 20 progresses to processing of S107, and in a case where the determination in S106 is negative, the ECU 20 repeats the processing of S106.

In a case where the determination in S106 is affirmative, in S107, the ignition by the ignition plug 15 and the fuel injection by the fuel injection valve 16 being continued theretofore are stopped. The processing of S107 corresponds to the control which is executed at the time t3 shown in FIG. 3A described above. At this time, the ignition permission flag is set to zero, the fuel injection stop flag is set to one, and the ignition and the fuel injection are stopped.

After the processing of S107, in S108, it is determined whether or not the fuel cut processing request flag Nflfc is zero. The processing of S108 is to determine whether or not to continue the fuel cut processing which is performed after the processing of S107. In S108, the value of the fuel cut processing request flag Nflfc which is set according to the known flow different from this flow during the execution of this flow and stored in the ROM of the ECU 20 is read and the above-described determination is performed. For example, when the engine rotation speed becomes equal to or lower than the predetermined speed or when the accelerator operation amount becomes greater than the zero by a driver's operation, the fuel cut processing request flag Nflfc is set to zero. Then, in a case where the determination in S108 is negative, that is, in a case where there is the fuel cut processing request, the ECU 20 repeats the processing of S108.

In a case where the determination in S108 is affirmative, that is, in a case where there is no fuel cut processing request, the ECU 20 progresses to first recovery processing. The first recovery processing will be described below.

In a case where the determination in S103 is negative, in this case, since there is little concern that the noble metal carried on the three-way catalyst 6 is deteriorated due to oxidation, in S109, the fuel cut processing starts normally. In S109, in a state in which the exhaust shutoff valve 5 is fully opened and the EGR valve 8 is fully closed, the ignition by the ignition plug 15 and the fuel injection by the fuel injection valve 16 are stopped. At this time, an intake air flow rate (that is, fresh air flow rate) is controlled by adjusting the opening of the intake throttle 3.

After the processing of S109, in S110, it is determined whether or not the fuel cut processing request flag Nflfc is zero. The processing of S110 is the substantially same as the processing of S108. In a case where the determination in S110 is negative, the ECU 20 repeats the processing of S110.

In a case where the determination in S110 is affirmative, the ECU 20 progresses to second recovery processing. The second recovery processing is normal recovery processing different from the above-described first recovery processing. That is, in the second recovery processing, unlike the first recovery processing described below, since it is not necessary to scavenge EGR gas, the ignition starts along with the start of the fuel injection.

In the above-described control flow, with the execution of the fuel cut processing, the deterioration of the noble metal carried on the three-way catalyst 6 due to oxidation is suitably suppressed.

Modification Example 1

Figure 5:
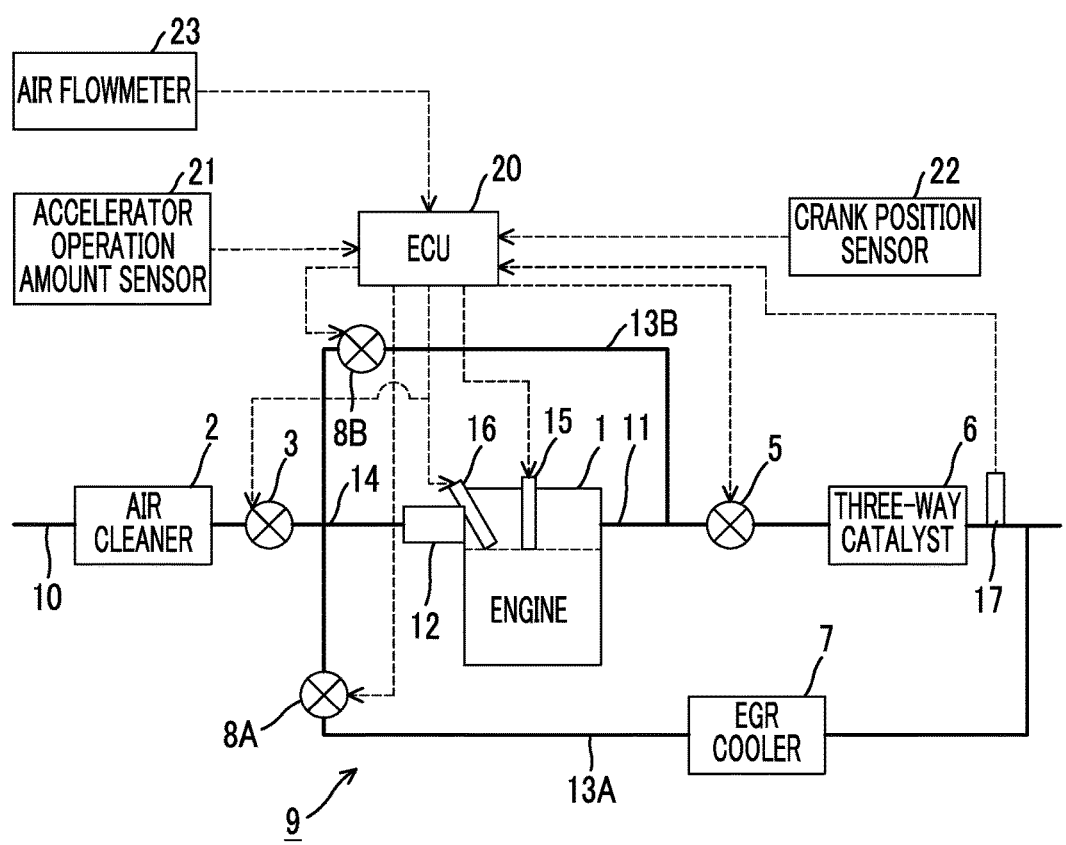
FIG. 5 is a diagram showing the schematic configuration of a natural aspiration gasoline engine according to a modification example of the present disclosure.

Hereinafter, a modification example of the present disclosure will be described referring to the drawings. FIG. 5 is a diagram showing the schematic configuration of a gasoline engine 1 according to this modification example. In this modification example, detailed description of the substantially same configurations as those shown in FIG. 1 described above and the substantially same kinds of processing as those in FIG. 4 described above will not be repeated.

The gasoline engine 1 according to this modification example includes two circulation paths for EGR gas circulated to the intake passage 10. A circulation path which has the substantially same configuration as the circulation path formed by the EGR passage 13, the EGR cooler 7, and the EGR valve 8 shown in FIG. 1 described above and is formed by a first EGR passage 13A, an EGR cooler 7, and a first EGR valve 8A is referred to as a first EGR path. Then, a circulation path which is formed by a second EGR passage 13B having one end connected to the exhaust passage 11 on an upstream side of the exhaust shutoff valve 5 and the other end connected to the intake passage 10 at a junction 14 and a second EGR valve 8B disposed in the second EGR passage 13B is referred to as a second EGR path. The first EGR passage 13A, the second EGR passage 13B, the EGR cooler 7, the first EGR valve 8A, and the second EGR valve 8B form an EGR device 9 according to this modification example.

The control device of the gasoline engine 1 according to this modification example executes fuel cut processing according to the control flow shown in FIG. 4 in principle as in Example 1 described above. However, the control device of the gasoline engine 1 according to this embodiment forms an intake control state by fully closing the intake throttle 3 and fully opening the first EGR valve 8A.

On the other hand, in the gasoline engine 1 according to Example 1 described above, the pumping loss becomes comparatively large with an increase in the exhaust shutoff valve upstream pressure when the exhaust shutoff valve 5 is opened, and as a result, a sense of deceleration of the vehicle can be secured; however, in a case where the exhaust shutoff valve upstream pressure becomes excessively high, it is not preferable in that a pumping loss is likely to become greater than a pumping loss required for securing a sense of deceleration of the vehicle. Accordingly, the control device of the gasoline engine 1 according to this modification example adjusts the exhaust shutoff valve upstream pressure by opening the second EGR valve 8B. Hereinafter, the fuel cut processing which is performed by the control device of the gasoline engine 1 according to this modification example will be described in detail referring to time charts shown in FIGS. 6A and 6B.

FIG. 6A shows transitions of the accelerator operation amount, the fuel cut processing request flag, the fuel injection stop flag, the ignition permission flag, the opening of the intake throttle 3, the opening of the exhaust shutoff valve 5, the opening of the first EGR valve 8A, and the opening of the second EGR valve 8B in a process in which the gasoline engine 1 is decelerating. FIG. 6B shows transitions of the opening of the intake throttle 3, the opening of the exhaust shutoff valve 5, the opening of the first EGR valve 8A, the opening of the second EGR valve 8B, the intake throttle downstream pressure, the exhaust shutoff valve upstream pressure, and the EGR amount in a process in which the gasoline engine 1 is decelerating. For description, the transitions of the opening of the intake throttle 3, the opening of the exhaust shutoff valve 5, the opening of the first EGR valve 8A, and the opening of the second EGR valve 8B shown in FIG. 6A are also shown in FIG. 6B. The transitions shown in FIG. 6A other than the opening of the second EGR valve 8B are the same as the transitions thereof shown in FIG. 3A described above.

In control processing shown in FIG. 6A, as in FIG. 3A described above, the operation state of the gasoline engine 1 during the period from the time t0 to the time t1 transits from the operation state represented by the point A shown in FIG. 2 described above to the operation state represented by the point B. In this modification example, when the operation state of the gasoline engine 1 belongs to the operation state represented by the point A, the first EGR valve 8A is opened and the second EGR valve 8B is fully closed. That is, circulation of EGR gas (hereinafter, referred to as a "first EGR gas") circulated to the intake passage 10 through the first EGR path is executed, and circulation of EGR gas (hereinafter, referred to as a "second EGR gas") to the intake passage 10 through the second EGR path is stopped. Then, at the time t1, the first EGR valve 8A is fully closed. This control is normal control which is executed at the time of normal operation of the gasoline engine 1. Then, if the exhaust shutoff valve 5 is fully closed at the time t2, the formation of the intake control state starts, at the time t2, control for fully opening the first EGR valve 8A starts, and at the time t3, the first EGR valve 8A is fully opened. In the control processing shown in FIG. 6A, in addition, if the exhaust shutoff valve 5 is fully closed at the time t2, control for opening the second EGR valve 8B starts, and at the time t3, the second EGR valve 8B becomes a first predetermined opening D1.

The second EGR valve 8B is opened in this way, whereby the second EGR gas is circulated from the exhaust passage 11 on the upstream side of the exhaust shutoff valve 5, and as shown in FIG. 6B, the exhaust shutoff valve upstream pressure decreases in response to opening of the second EGR valve 8B at the time t2. At this time, in comparison with the state during the period from the time t2 to the time t3 in Example 1 shown in FIG. 3B described above, the EGR amount becomes large, and accordingly, the negative pressure of the intake passage 10 on the downstream side of the intake throttle 3 becomes small (that is, becomes pressure close to the atmospheric pressure). In this way, in this modification example, the pumping loss of the gasoline engine 1 is adjusted by changing the pressure balance of the intake throttle downstream pressure and the exhaust shutoff valve upstream pressure. In this modification example, the first predetermined opening D1 which is the opening of the second EGR valve 8B at the time t3 is set such that a desired pumping loss is obtained. In addition, in this modification example, since the EGR amount circulated in the process of the formation of the intake control state becomes large, the inflow of fresh air from the intake passage 10 on the upstream side of the intake throttle 3 to the intake passage 10 on the downstream side of the intake throttle 3 is obstructed, and thus, it is possible to suitably suppress deterioration of the noble metal carried on the three-way catalyst 6 due to oxidation.

Example 2

Next, Example 2 of the present disclosure will be described based on FIG. 7. Detailed description of the substantially same configurations and the substantially same kinds of control processing as those in Example 1 will not be repeated.

In Example 1 described above, combustion is performed in a situation in which the EGR rate in the cylinder becomes comparatively high in the process of the formation of the intake control state. At this time, while stabilization of combustion is achieved by blowback of exhaust gas and residual gas, if combustion is performed in a situation in which the EGR rate in the cylinder becomes high, flame-out easily occurs. Then, if flame-out occurs, torque variation of the gasoline engine 1 occurs. Accordingly, the ECU 20 which is the control device of the gasoline engine 1 according to this example stops the ignition by the ignition plug 15 being continued theretofore in a situation in which the EGR rate becomes high in a process of fully closing the intake throttle 3 with the formation of the intake control state. Then, the fuel injection is continued until the formation of the intake control state is completed. Hereinafter, fuel cut processing which is performed by the control device of the gasoline engine 1 according to this example will be described in detail referring to a time chart shown in FIG. 7.

FIG. 7 shows, as in FIG. 3A described above, transitions of the accelerator operation amount, the fuel cut processing request flag, the fuel injection stop flag, the ignition permission flag, the opening of the intake throttle 3, the opening of the exhaust shutoff valve 5, and the opening of the EGR valve 8 in a process in which the gasoline engine 1 is decelerating. The time chart shown in FIG. 7 is different from the time chart shown in FIG. 3A described above in view of an ignition stop time.

In the control processing shown in FIG. 7, at a time t23 at which a period Δt3 as a third predetermined period has passed from the time t2 at which opening of the intake throttle 3 has started, the ignition permission flag is set to zero, and the ignition by the ignition plug 15 being continued theretofore is stopped. The third predetermined period is a period less than a period from the time t2 at which closing of the intake throttle 3 starts to the time t3 at which the intake throttle 3 is fully closed. Then, in a process in which the intake throttle 3 is fully closed (the period from the time t2 to the time t3), the amount of fresh air out of intake air sucked into the cylinder decreases and the amount of EGR gas increases. After the time t23 at which the period Δt3 has passed from the time t2, if the ignition by the ignition plug 15 is performed, there is a concern that flame-out occurs due to an increase in the EGR rate. For this reason, in the control processing shown in FIG. 7, the ignition is stopped at the time t23. With this, the occurrence of torque variation of the gasoline engine 1 is suppressed. In addition, in the control processing shown in FIG. 7, the fuel injection is continued to the time t3. Hereinafter, during a period from the time t23 to the time t3, the operation by the fuel injection after the ignition is stopped will be described.

During the period from the time t23 to the time t3, since the intake throttle 3 is being fully closed and the intake throttle 3 is opened not a little, fresh air is supplied from the intake passage 10 on the upstream side of the intake throttle 3 and is sucked into the cylinder of the gasoline engine 1. At this time, since the ignition by the ignition plug 15 is stopped, fresh air sucked into the cylinder is not used for combustion in the cylinder and is discharged from the cylinder to the exhaust passage 11. At this time, while the exhaust shutoff valve 5 is fully closed, as described above, exhaust gas discharged from the cylinder to the exhaust passage 11 flows out from the exhaust passage 11 on the upstream side of the exhaust shutoff valve 5 to the exhaust passage 11 on the downstream side of the exhaust shutoff valve 5 through the exhaust shutoff valve 5 in the fully closed state. Accordingly, fresh air sucked into the cylinder and discharged to the exhaust passage 11 as it is leaks from the exhaust shutoff valve 5 in the fully closed state and flows into the three-way catalyst 6. Fuel injected by the fuel injection valve 16 during the period from the time t23 to the time t3 is not used for combustion in the cylinder, is discharged from the cylinder to the exhaust passage 11, leaks from the exhaust shutoff valve 5 in the fully closed state, and flows into the three-way catalyst 6. As a result, in the three-way catalyst 6, fuel (hereinafter, referred to as "passing fuel") passing through the cylinder of the gasoline engine 1 and flowing into the three-way catalyst 6 and oxygen included in fresh air (hereinafter, referred to as "passing fresh air") passing through the cylinder of the gasoline engine 1 and flowing into the three-way catalyst 6 react with each other. At this time, since the inflow of oxygen into the three-way catalyst 6 is suppressed as much as possible by blowback of exhaust gas and residual gas when the exhaust shutoff valve 5 is fully closed, the amount of oxygen reacting in the three-way catalyst 6 is extremely small, and a temperature increase of the three-way catalyst 6 due to the reaction is suppressed to be low. Even in a case where the three-way catalyst 6 is provided in the exhaust passage 11 on the upstream side of the exhaust shutoff valve 5, the inflow of oxygen into the three-way catalyst 6 is suppressed as much as possible by blowback of exhaust gas and residual gas.

As described above, the control device of the gasoline engine 1 according to this example stops the ignition in a situation in which the EGR rate becomes high in the process of the formation of the intake control state, and continues the fuel injection until the formation of the intake control state is completed, whereby it is possible to consume oxygen included in fresh air flowing into the three-way catalyst 6 while suppressing the occurrence of torque variation of the gasoline engine 1, and thus, to suitably suppress deterioration of the noble metal carried on the three-way catalyst 6 due to oxidation.

Example 3

Next, Example 3 of the present disclosure will be described based on FIG. 8. Detailed description of the substantially same configurations and the substantially same kinds of control processing as those in Example 1 described above will not be repeated.

In Example 1 described above, during a certain period (at this time, the intake control state is formed and the ignition is stopped) after the intake control state is formed, there is a concern that fresh air (hereinafter, referred to as "remaining fresh air") in the intake passage 10 on the downstream side of the intake throttle 3, the intake manifold 12, and an intake port (hereinafter, referred to as an "intake throttle downstream intake configuration") is sucked into the cylinder along with EGR gas, is discharged to the exhaust passage 11 as it is, leaks from the exhaust shutoff valve 5 in the fully closed state, and flows into the three-way catalyst 6. This is not preferable from the viewpoint of deterioration of the noble metal carried on the three-way catalyst 6 due to oxidation. Accordingly, the ECU 20 which is the control device of the gasoline engine 1 according to this example continues the fuel injection being continued theretofore until a period in which remaining fresh air can flow into the three-way catalyst 6 elapses. Hereinafter, fuel cut processing which is performed by the control device of the gasoline engine 1 according to this example will be described in detail referring to a time chart shown in FIG. 8.

FIG. 8 shows, as in FIG. 3A described above, transitions of the accelerator operation amount, the fuel cut processing request flag, the fuel injection stop flag, the ignition permission flag, the opening of the intake throttle 3, the opening of the exhaust shutoff valve 5, and the opening of the EGR valve 8 in a process in which the gasoline engine 1 is decelerating. The time chart shown in FIG. 8 is different from the time chart shown in FIG. 3A described above in view of a fuel injection stop time.

In the control processing shown in FIG. 8, as in the control processing shown in FIG. 3A described above, the ignition by the ignition plug 15 being continued theretofore is stopped at the time t3. Then, unlike the control processing shown in FIG. 3A described above, the fuel injection is continued to a time t4. The time t4 is a time at which a period $\Delta t1$ as the first predetermined period has passed from the time t3 as the time at which the formation of the intake control state has been completed. In this way, in the control processing shown in FIG. 8, since the fuel injection is continued to the time t4, during a period from the time t3 to the time t4, the ignition is stopped and only the fuel injection is executed. The above-described first predetermined period $\Delta t1$ will be described in detail. The above-described first predetermined period $\Delta t1$ is a period from when the formation of the intake control state is completed until remaining fresh air is sucked into the cylinder of the gasoline engine 1 and fresh air in the intake throttle downstream intake configuration becomes substantially zero. The above-described first predetermined period $\Delta t1$ has a correlation with the volume of the intake throttle downstream intake configuration, and for example, if the gasoline engine 1 performs an intake stroke three times after the formation of the intake control state is completed, in a case where remaining fresh air becomes substantially zero, the above-described first predetermined period $\Delta t1$ is set to a period according to the operation cycle. Then, the above-described first predetermined period $\Delta t1$ is stored in the ROM of the ECU 20 in the form of a value, a map, or a function determined in advance.

During the period from the time t3 to the time t4, fuel injected by the fuel injection valve 16 and remaining fresh air are discharged from the cylinder to the exhaust passage 11 as they are, leak from the exhaust shutoff valve 5 in the fully closed state, and flow into the three-way catalyst 6. Then, fuel flowing into the three-way catalyst 6 and oxygen included in remaining fresh air flowing into the three-way catalyst 6 react with each other in the three-way catalyst 6.

As above, the control device of the gasoline engine 1 according to this example continues the fuel injection until a period in which remaining fresh air can flow into the three-way catalyst 6 elapses after the formation of the intake control state is completed, and a reaction of fuel flowing into the three-way catalyst 6 and oxygen included in remaining fresh air flowing into the three-way catalyst 6 is performed in the three-way catalyst 6, thereby suppressing deterioration of the noble metal due to oxidation caused by the inflow of remaining fresh air into the three-way catalyst 6.

Example 4

Figure 9:
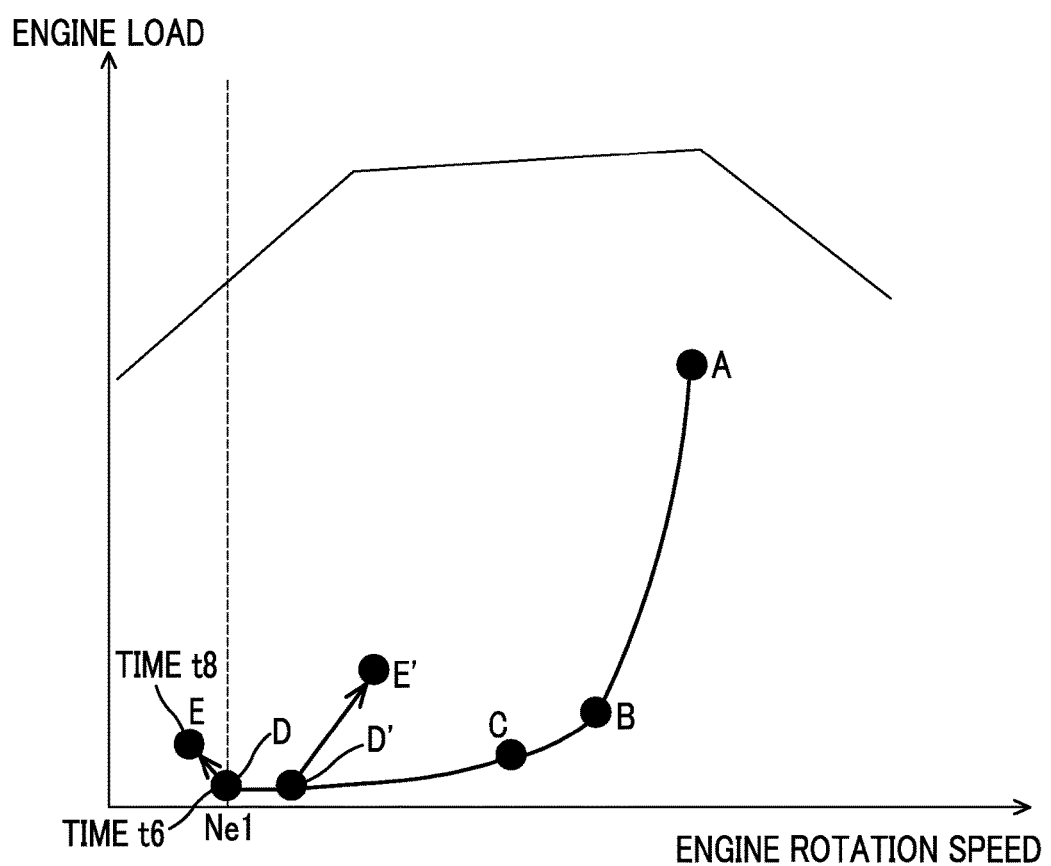
FIG. 9 is a diagram showing an operation state of a natural aspiration gasoline engine related to recovery processing from the time of execution of fuel cut processing according to the present disclosure.

Next, Example 4 of the present disclosure will be described based on FIGS. 9 to 11. Detailed description of the substantially same configurations and the substantially same kinds of control processing as those in Example 1 described above will not be repeated.

Example 1, Example 2, and Example 3 described above are examples where the fuel cut processing is executed. In contrast, this example is an example where first recovery processing which is recovery processing from the execution of the above-described fuel cut processing (the fuel cut processing which is executed after S104 to S106) according to the present disclosure is executed. In the first recovery processing according to this example, the exhaust shutoff valve 5, the intake throttle 3, and the EGR valve 8 are controlled, and the fuel injection start time by the fuel injection valve 16 and the ignition start time by the ignition plug 15 are controlled. In this example, the ECU 20 executes the first recovery processing.

At the time of the execution of the fuel cut processing, if the engine rotation speed of the gasoline engine 1 becomes equal or lower than a predetermined speed, recovery processing for avoiding engine stall, or the like is executed. Hereinafter, this control is referred to as "natural recovery control". At the time of the execution of the fuel cut processing, even when the accelerator operation amount becomes greater than zero by a driver's operation, recovery processing is executed. Hereinafter, this control is referred to as "compulsory recovery control".

An operation state of the gasoline engine 1 when the recovery processing is performed will be described referring to FIG. 9. FIG. 9 is a diagram showing an operation state of the gasoline engine 1 according to recovery processing from the time of the execution of the above-described fuel cut processing according to the present disclosure. A point D shown in FIG. 9 represents the operation state of the gasoline engine 1 when the engine rotation speed becomes the predetermined speed at the time of the execution of the fuel cut processing. In a case where the operation state of the gasoline engine 1 becomes the operation state represented by the point D, the natural recovery control is executed. As a result, the operation state of the gasoline engine 1 becomes an operation state represented by a point E. At this time, since there is no torque request to the gasoline engine 1, the amount of fresh air which starts to be sucked into the cylinder of the gasoline engine 1 becomes comparatively small. A point D' shown in FIG. 9 represents an operation state when the compulsory recovery control starts. Then, if the compulsory recovery control is executed, the operation state of the gasoline engine 1 becomes an operation state represented by a point E'. At this time, since there is a torque request to the gasoline engine 1, the amount of fresh air which starts to be sucked into the cylinder of the gasoline engine 1 becomes comparatively large.

As described above, while the fuel cut processing (the fuel cut processing which is executed after S104 to S106) according to the present disclosure is being executed, the inflow of fresh air from the intake passage 10 on the upstream side of the intake throttle 3 to the intake passage 10 on the downstream side of the intake throttle 3 is stopped, and the intake throttle downstream intake configuration is filled with EGR gas. When the recovery processing is executed in such a state, since the amount of fresh air out of intake air sucked into the cylinder easily becomes small and the amount of EGR gas easily becomes large, there is a concern that torque variation due to flame-out occurs. This is because, while the intake throttle 3 and the exhaust shutoff valve 5 fully closed theretofore are opened with the recovery processing, the amount of EGR gas sucked into the cylinder of the gasoline engine 1 easily becomes large until EGR gas with which the intake throttle downstream intake configuration is filled is scavenged by fresh air from the intake passage 10 on the upstream side of the intake throttle 3. Then, in a state in which opening of the exhaust shutoff valve 5 is not completed during the recovery processing, there is a concern that blowback of exhaust gas and residual gas occurs, and scavenging of EGR gas by fresh air becomes difficult. In a case where there is no torque request to the gasoline engine 1 and the natural recovery control, in which the amount of fresh air starting to be sucked into the cylinder of the gasoline engine 1 becomes comparatively small, is executed, in particular, scavenging of EGR gas by fresh air becomes slow, and torque variation due to flame-out easily occurs. Accordingly, as an example, the natural recovery control which is executed by the control device of the gasoline engine 1 according to this example will be hereinafter described in detail referring to a time chart shown in FIG. 10.

Figure 10:
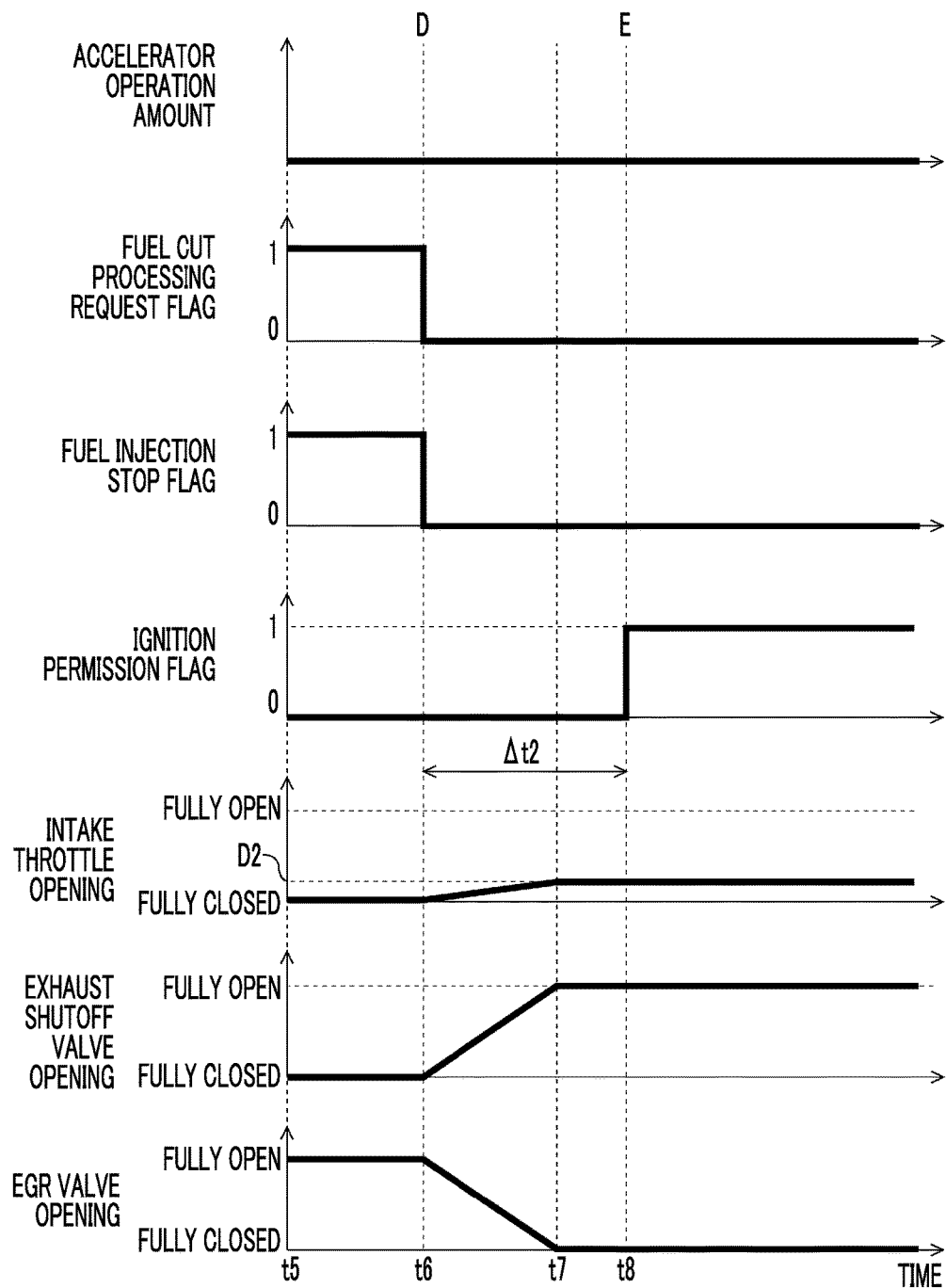
FIG. 10 is a time chart in a case where recovery processing according to Example 4 of the present disclosure is executed.
Figure 11:
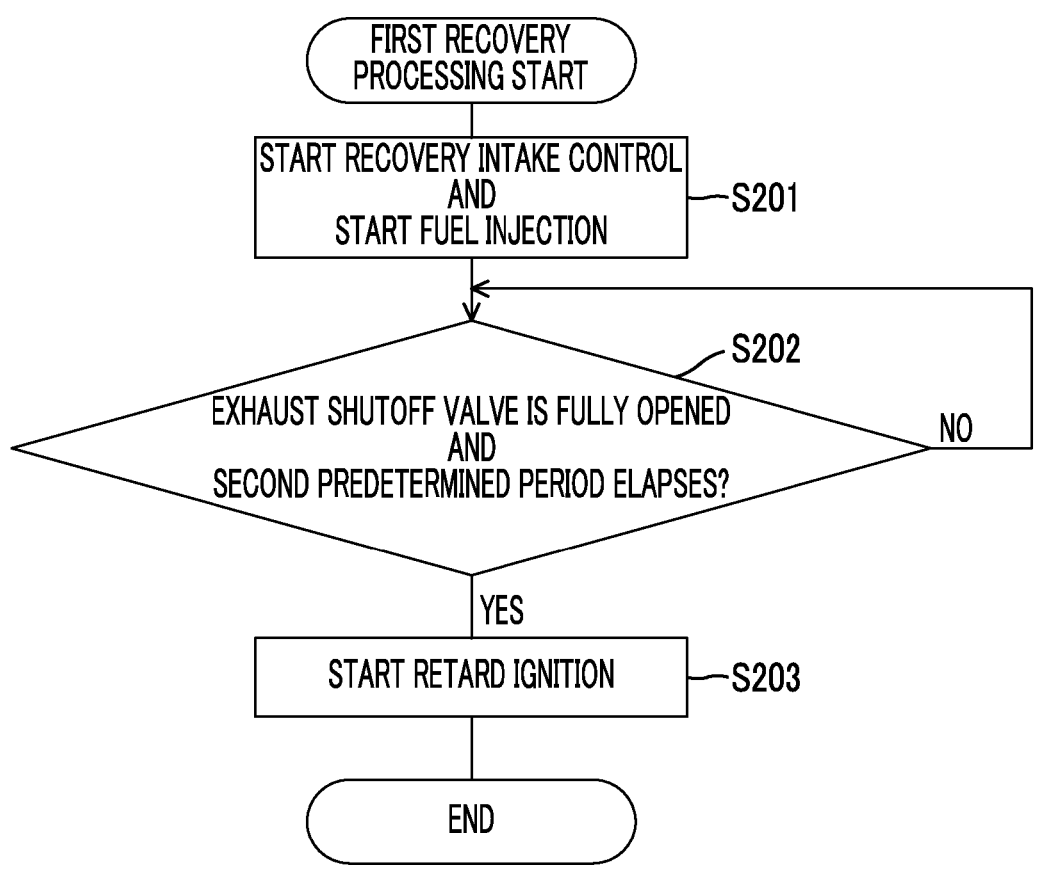
FIG. 11 is a flowchart showing a control flow which is executed by a control device of the natural aspiration gasoline engine according to Example 4.

FIG. 10 shows transitions of the accelerator operation amount, the fuel cut processing request flag, the fuel injection stop flag, the ignition permission flag, the opening of the intake throttle 3, the opening of the exhaust shutoff valve 5, and the opening of the EGR valve 8 for the natural recovery control which is executed by the control device of the gasoline engine 1 according to this example. At a time t5 shown in FIG. 10, the fuel cut processing is executed. Then, at a time t6 defined as a time at which the engine rotation speed becomes the predetermined speed, the fuel cut processing request flag is set to zero. The operation state of the gasoline engine 1 at the time t6 shown in FIG. 10 is represented by the point D shown in FIG. 9 described above.

Then, at the time t6 at which the fuel cut processing request flag is set to zero, opening of the intake throttle 3 and the exhaust shutoff valve 5 starts and opening of the EGR valve 8 starts, and at a time t7, the opening of the intake throttle 3 becomes a second predetermined opening D2, the exhaust shutoff valve 5 is fully opened, and the EGR valve 8 is fully closed. In the following description, control in which the fuel cut processing request disappears at the time of the execution of the fuel cut processing and which is performed for the intake throttle 3, the exhaust shutoff valve 5, and the EGR valve 8 as described above is referred to as "recovery intake control". The control device of the gasoline engine 1 according to this example executes the recovery intake control, thereby starting the supply of fresh air from the intake passage 10 on the upstream side of the intake throttle 3 as quickly as possible, stopping circulation of EGR gas from the EGR passage 13 to the intake passage 10, and guiding, in principle, fresh air into the cylinder of the gasoline engine 1 as intake air. The flow rate of fresh air from when the recovery intake control starts until the first recovery processing is completed is controlled by the situation of opening of the exhaust shutoff valve 5 and the opening of the intake throttle 3, and the second predetermined opening D2 as the target opening of the intake throttle 3 at this time is set based on the operation state (the operation state represented by the point E shown in FIG. 9 described above) of the gasoline engine 1 determined in advance after the first recovery processing is completed. In addition, in the control processing shown in FIG. 10, the fuel injection stop flag is set to zero at the time t6 in response to the start of opening of the intake throttle 3, and the fuel injection by the fuel injection valve 16 starts.

As described above, if the ignition is performed until EGR gas with which the intake throttle downstream intake configuration is filled is scavenged by fresh air, there is a concern that flame-out occurs due to an increase in the EGR rate. Accordingly, in the control processing shown in FIG. 10, at a time t8 which is a time, at which a period Δt2 as a second predetermined period has passed from the time t6, at which opening of the intake throttle 3 has started, and a time, at which the exhaust shutoff valve 5 is fully opened, the ignition permission flag is set to one and the ignition by the ignition plug 15 starts. That is, at the time t8, the first recovery processing is completed. The above-described second predetermined period Δt2 is a time from when opening of the intake throttle 3 starts until EGR gas with which the intake throttle downstream intake configuration is filled becomes substantially zero, and has a correlation with the volume of the intake throttle downstream intake configuration. The above-described second predetermined period Δt2 is stored in the ROM of the ECU 20 in the form of a value, a map, or a function determined in advance. Summarizing the above, the control device of the gasoline engine 1 according to this example does not start the ignition by the ignition plug 15 until the exhaust shutoff valve 5 is fully opened and the second predetermined period Δt2 elapses after opening of the intake throttle 3 starts, that is, until scavenging of EGR gas by fresh air is completed, thereby suppressing the occurrence of torque variation of the gasoline engine 1.

In the control processing shown in FIG. 10, during the period from the time t6 to the time t8, the ignition is stopped and only the fuel injection is executed. At this time, with the recovery intake control, fresh air is supplied from the intake passage 10 on the upstream side of the intake throttle 3 and is sucked into the cylinder of the gasoline engine 1. Then, fresh air sucked into the cylinder is not used for combustion in the cylinder, is discharged from the cylinder to the exhaust passage 11 as it is, and flows into the three-way catalyst 6. During the period from the time t6 to the time t8, fuel injected by the fuel injection valve 16 is not used for combustion in the cylinder, is discharged from the cylinder to the exhaust passage 11 as it is, and flows into the three-way catalyst 6. As a result, in the three-way catalyst 6, passing fuel and oxygen included in passing fresh air react with each other. If the air-fuel ratio of the air-fuel mixture at this time becomes equal to or less than the stoichiometric air-fuel ratio, it is possible to consume oxygen included in passing fresh air as quickly as possible.

The control device of the gasoline engine 1 according to this example executes the control described above, thereby consuming oxygen included in fresh air flowing into the three-way catalyst 6 while suppressing the occurrence of torque variation of the gasoline engine 1 at the time of the execution of the first recovery processing, and thus, suitably suppressing deterioration of the noble metal carried on the three-way catalyst 6 due to oxidation.

The time chart shown in FIG. 10 illustrates the natural recovery control out of the first recovery processing, which is executed by the control device of the gasoline engine 1 according to this example. Even in a case where the control device executes the compulsory recovery control, in order to suppress the occurrence of torque variation of the gasoline engine 1 accompanied by the first recovery processing, the stop of the ignition may be continued until the exhaust shutoff valve 5 is fully opened and the second predetermined period elapses after opening of the intake throttle 3 starts, that is, until scavenging of EGR gas by fresh air is completed. In this case, since there is a torque request to the gasoline engine 1, and the amount of fresh air which starts to be sucked into the cylinder becomes comparatively large, scavenging of EGR gas can be completed faster than in a case where the natural recovery control is performed.

A control flow which is executed by the control device of the gasoline engine 1 according to this example will be described based on FIG. 11. FIG. 11 is a flowchart showing the flow of control with the natural recovery control, which is executed by the control device of the gasoline engine 1 according to this example, as an example. In this example, this flow is executed by the ECU 20. This flow is the flow of control according to the first recovery processing which is executed following the fuel cut processing (the fuel cut processing which is executed after S104 to S106) of the present disclosure.

In this flow, first, in S201, the recovery intake control and the fuel injection by the fuel injection valve 16 start. In S201, control for making the opening of the intake throttle 3 become the second predetermined opening, control for fully opening the exhaust shutoff valve 5, and control for fully closing the EGR valve 8 start, and the fuel injection by the fuel injection valve 16 starts. The processing of S201 is executed, whereby the supply of fresh air from the intake passage 10 on the upstream side of the intake throttle 3 starts and circulation of EGR gas from the EGR passage 13 to the intake passage 10 is stopped. The processing of S201 corresponds to the control which is executed during the period from the time t6 to the time t7 shown in FIG. 10 described above.

Next, in S202, it is determined whether or not the exhaust shutoff valve 5 is fully opened and the second predetermined period has elapsed after opening of the intake throttle 3 has started. As described above, the second predetermined period is a period until EGR gas with which the intake throttle downstream intake configuration is filled becomes substantially zero, and is stored in the ROM of the ECU 20 in advance. In a case where the determination in S202 is affirmative, the ECU 20 progresses to processing of S203, and in a case where the determination in S202 is negative, the ECU 20 repeats the processing of S202.

In a case where the determination in S202 is affirmative, in S203, the ignition by the ignition plug 15 starts. In S203, ignition time retard control is also executed, and a torque level difference accompanied by ignition start is suppressed. The processing of S203 corresponds to the control which is executed at the time t8 shown in FIG. 10 described above. After the processing of S203, the execution of this flow ends.

As in the above-described control flow, if the control according to the recovery processing is executed, the occurrence of torque variation of the gasoline engine 1 at the time of the execution of the first recovery processing is suppressed, and in addition, oxygen included in fresh air flowing into the three-way catalyst 6 is consumed. With this, deterioration of the noble metal carried on the three-way catalyst 6 due to oxidation is suppressed.

What is claimed is:

1. A control device for an engine,
the engine being a natural aspiration gasoline engine,
the engine including an intake throttle, a fuel injection valve, an ignition plug, an exhaust shutoff valve, an EGR device, and a three-way catalyst,
the intake throttle being provided in an intake passage of the engine, the exhaust shutoff valve being provided in an exhaust passage of the engine, and the exhaust shutoff valve being configured to open and close the exhaust passage, the EGR device including an EGR passage and an EGR valve, the EGR passage being configured to recirculate EGR gas as a part of exhaust gas discharged from the engine from the exhaust passage on a downstream side of the exhaust shutoff valve to the intake passage on a downstream side of the intake throttle, and the EGR valve being provided in the EGR passage, and the three-way catalyst being provided in the exhaust passage, the control device comprising:

an electronic control unit configured to execute fuel cut processing by stopping fuel injection from the fuel injection valve and stopping ignition by the ignition plug, when the electronic control unit determines that, during deceleration of the engine, a temperature of the three-way catalyst is equal to or higher than a predetermined temperature and execution conditions of the fuel cut processing are established, the electronic control unit being configured to execute first control for performing control such that the exhaust shutoff valve is brought into a closed state while the fuel injection from the fuel injection valve and the ignition by the ignition plug are continued such that an air-fuel ratio of an air-fuel mixture becomes a predetermined air-fuel ratio equal to or less than a stoichiometric air-fuel ratio, when the exhaust shutoff valve reaches the closed state in the first control, the electronic control unit being configured to execute second control for performing control such that the engine is brought into an intake control state, the intake control state being a state in which the intake throttle is brought into a closed state and the EGR valve is brought into a predetermined open state, and in the second control, the electronic control unit being configured to execute the fuel cut processing by stopping the ignition being continued in the first control until the engine is brought into the intake control state and stopping the fuel injection being continued in the first control after the engine is brought into the intake control state.

2. The control device according to claim 1, wherein in a process until the engine is brought into the intake control state through the second control performed by the electronic control unit, the electronic control unit is configured to stop the ignition being continued in the first control after the intake throttle starts to be closed and before the engine is brought into the intake control state, and configured to stop the fuel injection being continued in the first control when the engine is brought into the intake control state.

3. The control device according to claim 1, wherein in the second control, the electronic control unit is configured to stop the ignition being continued in the first control until the engine is brought into the intake control state, and configured to stop the fuel injection being continued in the first control when a first predetermined period elapses after the engine is brought into the intake control state.

4. The control device according to claim 1, wherein the electronic control unit is configured to execute recovery processing from the fuel cut processing, the recovery processing is processing for bringing the exhaust shutoff valve into an open state, opening the intake throttle, and bringing the EGR valve into a closed state, the electronic control unit is configured to start fuel injection from the fuel injection valve in response to the start of opening of the intake throttle in the recovery processing, and the electronic control unit is configured to start ignition by the ignition plug when the exhaust shutoff valve is brought into the open state in the recovery processing and when a second predetermined period elapses after opening of the intake throttle starts.

5. A control method for an engine, the engine being a natural aspiration gasoline engine, the engine including an intake passage, an intake throttle, a fuel injection valve, an ignition plug, an exhaust passage, an exhaust shutoff valve, an EGR device, a three-way catalyst, and an electronic control unit, the intake throttle being provided in an intake passage of the engine, the exhaust shutoff valve being provided in the exhaust passage, and the exhaust shutoff valve being configured to open and close the exhaust passage, the EGR device including an EGR passage and an EGR valve, the EGR passage being configured to recirculate EGR gas as a part of exhaust gas discharged from the engine from the exhaust passage on a downstream side of the exhaust shutoff valve to the intake passage on a downstream side of the intake throttle, and the EGR valve being provided in the EGR passage, the three-way catalyst being provided in the exhaust passage, and the electronic control unit being configured to execute fuel cut processing by stopping fuel injection from the fuel injection valve and stopping ignition by the ignition plug, the control method comprising:

determining, by the electronic control unit, that, during deceleration of the engine, a temperature of the three-way catalyst is equal to or higher than a predetermined temperature and execution conditions of the fuel cut processing are established;

in response to the determining, executing, by the electronic control unit, first control for performing control such that the exhaust shutoff valve is brought into a closed state while the fuel injection from the fuel injection valve and the ignition by the ignition plug are continued such that an air-fuel ratio of an air-fuel mixture becomes a predetermined air-fuel ratio equal to or less than a stoichiometric air-fuel ratio;

when the exhaust shutoff valve reaches the closed state by the first control, executing, by the electronic control unit, second control for performing control such that the engine is brought into an intake control state, the intake control state being a state in which the intake throttle is brought into a closed state and the EGR valve is brought into a predetermined open state; and in the second control, executing, by the electronic control unit, the fuel cut processing by stopping the ignition being continued in the first control until the engine is brought into the intake control state and stopping the fuel injection being continued in the first control after the engine is brought into the intake control state.

* * * * *

UNITED STATES PATENT AND TRADEMARK OFFICE
CERTIFICATE OF CORRECTION

PATENT NO. : 10,393,044 B2
APPLICATION NO. : 15/642897
DATED : August 27, 2019
INVENTOR(S) : Hirokazu Ito, Yuji Yamaguchi and Yuji Miyoshi Page 1 of 1

It is certified that error appears in the above-identified patent and that said Letters Patent is hereby corrected as shown below:

In the Specification

Column 12, Line 21, delete "focus" and insert --forms--, therefor.

Signed and Sealed this
Twenty-second Day of October, 2019

Andrei Iancu
*Director of the United States Patent and Trademark Office*